(12) United States Patent
Ravine

(10) Patent No.: US 12,284,147 B2
(45) Date of Patent: *Apr. 22, 2025

(54) TECHNIQUES FOR OPTIMIZING THE DISPLAY OF VIDEOS

(71) Applicant: Guy Ravine, San Francisco, CA (US)

(72) Inventor: Guy Ravine, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,592

(22) Filed: Jul. 31, 2023

(65) Prior Publication Data

US 2023/0412544 A1 Dec. 21, 2023

Related U.S. Application Data

(63) Continuation of application No. 17/119,980, filed on Dec. 11, 2020, now Pat. No. 11,716,300, which is a continuation-in-part of application No. 15/530,611, filed on Feb. 6, 2017, now Pat. No. 11,038,939, which is a continuation of application No. 14/180,169, filed on Feb. 13, 2014, now Pat. No. 9,565,226.

(60) Provisional application No. 61/764,517, filed on Feb. 13, 2013, provisional application No. 62/942,205, filed on Dec. 1, 2019.

(51) Int. Cl.
| | |
|---|---|
| *G06F 3/0488* | (2022.01) |
| *G06F 3/04883* | (2022.01) |
| *G06V 10/25* | (2022.01) |
| *G06V 20/40* | (2022.01) |
| *H04L 12/18* | (2006.01) |
| *H04L 51/10* | (2022.01) |
| *H04L 65/60* | (2022.01) |
| *H04L 65/61* | (2022.01) |
| *G06V 10/46* | (2022.01) |
| *G06V 40/16* | (2022.01) |

(52) U.S. Cl.
CPC .......... *H04L 51/10* (2013.01); *G06F 3/04883* (2013.01); *G06V 10/25* (2022.01); *G06V 20/41* (2022.01); *H04L 12/1822* (2013.01); *H04L 65/60* (2013.01); *H04L 65/61* (2022.05); *G06V 10/462* (2022.01); *G06V 40/16* (2022.01)

(58) Field of Classification Search
CPC ............... H04L 51/10; G06V 10/25; G06F 2203/04806; G06F 3/0346; G06F 3/04845; G06F 3/04883
See application file for complete search history.

(56) References Cited

U.S. PATENT DOCUMENTS 10,645,331 B1 * 5/2020 Li ................ H04N 21/47217
2012/0154386 A1 * 6/2012 Nagara ................ G06F 3/147
345/619

(Continued)

*Primary Examiner* — Phenuel S Salomon
(74) *Attorney, Agent, or Firm* — Mark D. Spiller

(57) ABSTRACT

The disclosed embodiments disclose techniques for optimizing the display of videos. During operation, a computing device receives a video stream to be displayed. The computing device determines a preferred orientation for the video stream, determines a present orientation for the computing device, and determines a mismatch between the preferred orientation and the present orientation. The computing device adjusts the video stream while displaying the video stream on the display. As the video stream plays, the computing device detects any rotation of the computing device, and if so, re-adjusts how the video stream is displayed.

12 Claims, 22 Drawing Sheets

(56) References Cited

U.S. PATENT DOCUMENTS

| | | | | |
|---|---|---|---|---|
| 2012/0230429 A1* | 9/2012 | Boyce | ............... | H04N 19/85 |
| | | | | 375/E7.026 |
| 2014/0043231 A1* | 2/2014 | Yoshioka | ............. | G09G 5/00 |
| | | | | 345/156 |
| 2014/0149926 A1* | 5/2014 | Min | .................. | G06T 3/4038 |
| | | | | 715/788 |
| 2015/0281300 A1* | 10/2015 | Ganesh | ........... | H04N 21/25825 |
| | | | | 709/204 |
| 2015/0309686 A1* | 10/2015 | Morin | ................ | G06F 3/0488 |
| | | | | 715/720 |
| 2017/0062012 A1* | 3/2017 | Bloch | ................ | G11B 27/36 |
| 2018/0316948 A1* | 11/2018 | Todd | .............. | H04N 21/4312 |
| 2021/0049984 A1* | 2/2021 | Cain | ................ | G06F 1/1694 |

\* cited by examiner

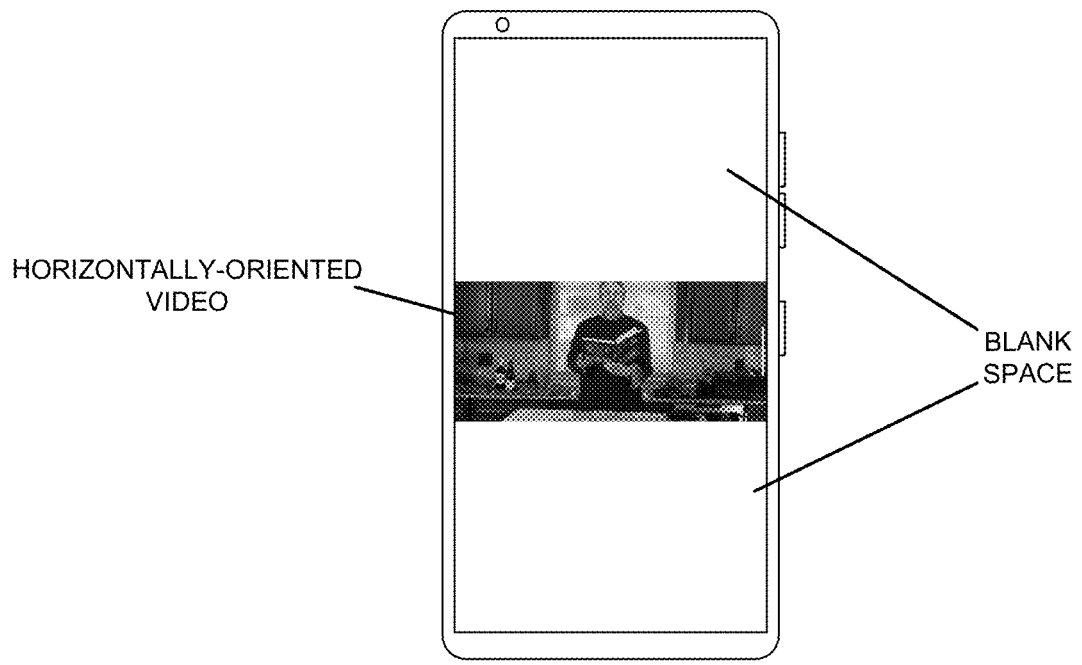
FIG. 1A – PRIOR ART
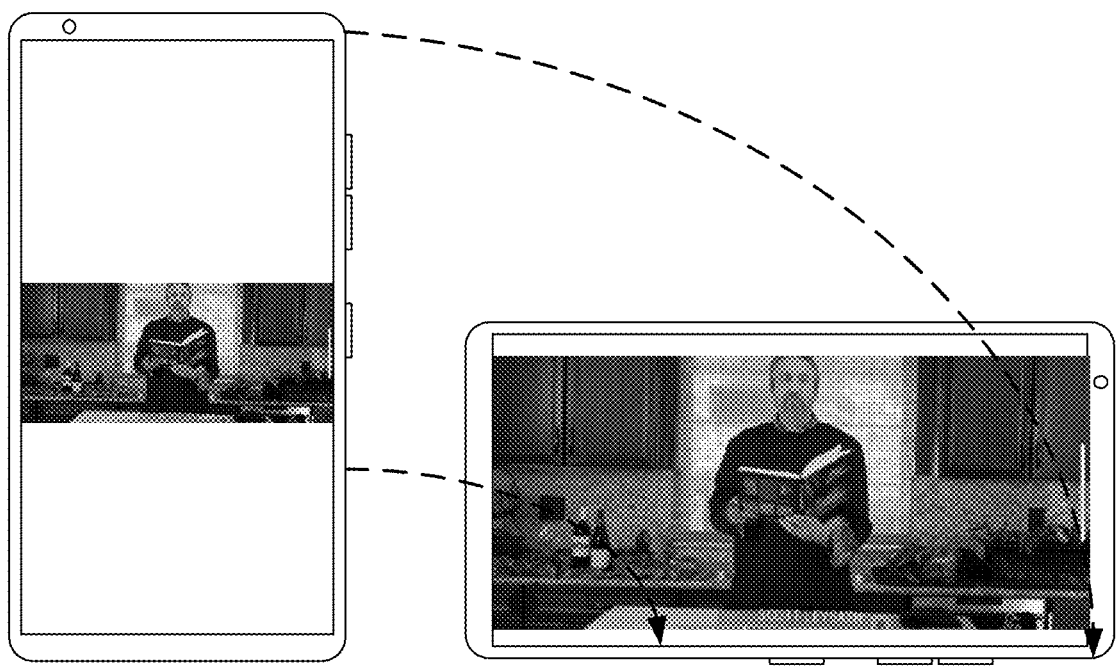
FIG. 1B – PRIOR ART

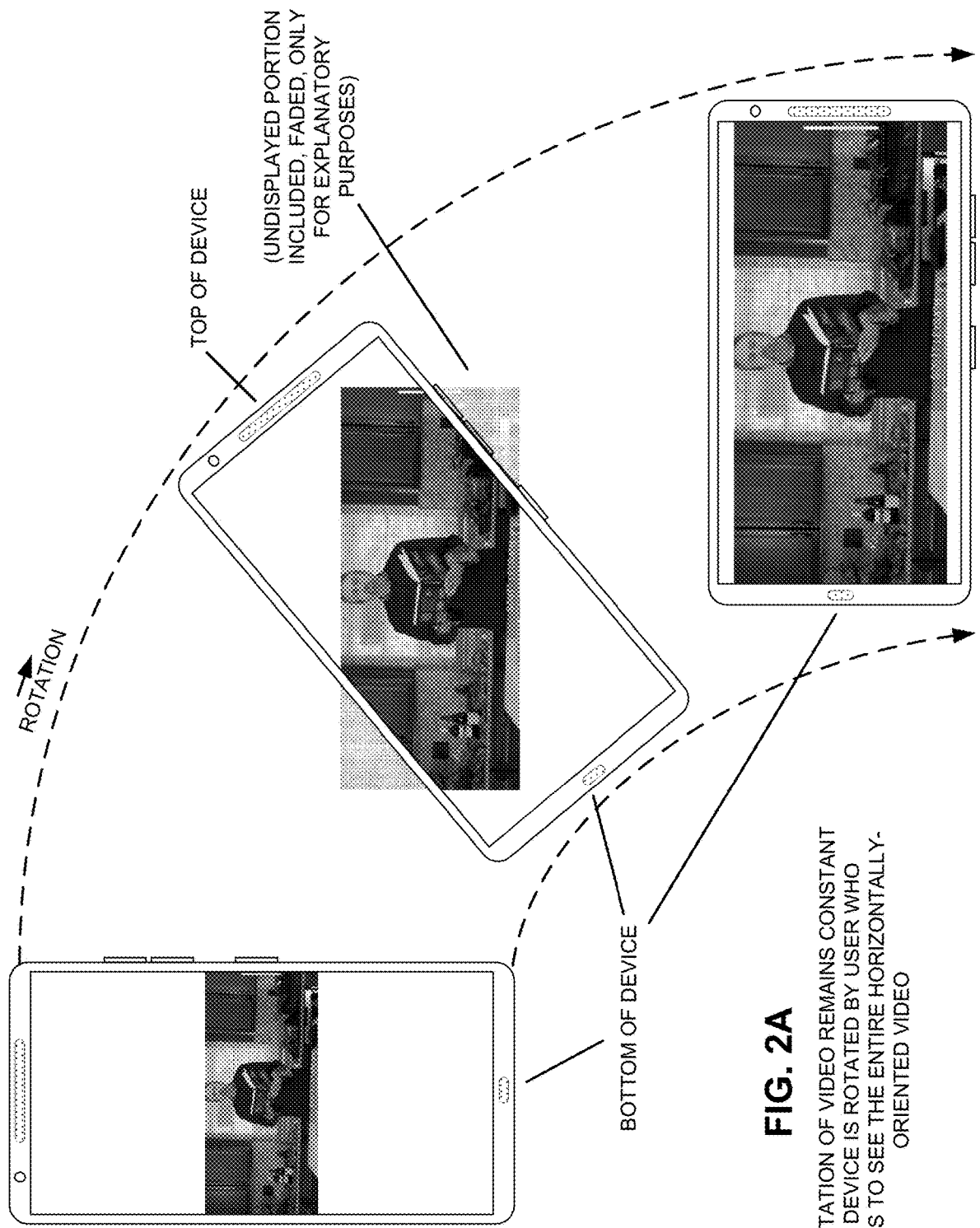

ORIENTATION OF VIDEO REMAINS CONSTANT AS DEVICE IS ROTATED BY USER WHO WANTS TO SEE THE ENTIRE HORIZONTALLY-ORIENTED VIDEO; INITIAL SIZE MATCHES HORIZONTAL ROTATED SIZE WITH SOME SIDE-CROPPING

ORIENTATION OF VIDEO REMAINS CONSTANT AS DEVICE IS ROTATED BY USER, DISPLAY IS ALWAYS COMPLETELY FILLED WITH CONTENT (E.G. INITIALLY A PORTION OF THE HORIZONTALLY-ORIENTED VIDEO IS ZOOMED IN TO FILL SCREEN, AND THEN ZOOMED OUT DURING ROTATION TO SHOW FULL-SCREEN VIDEO)

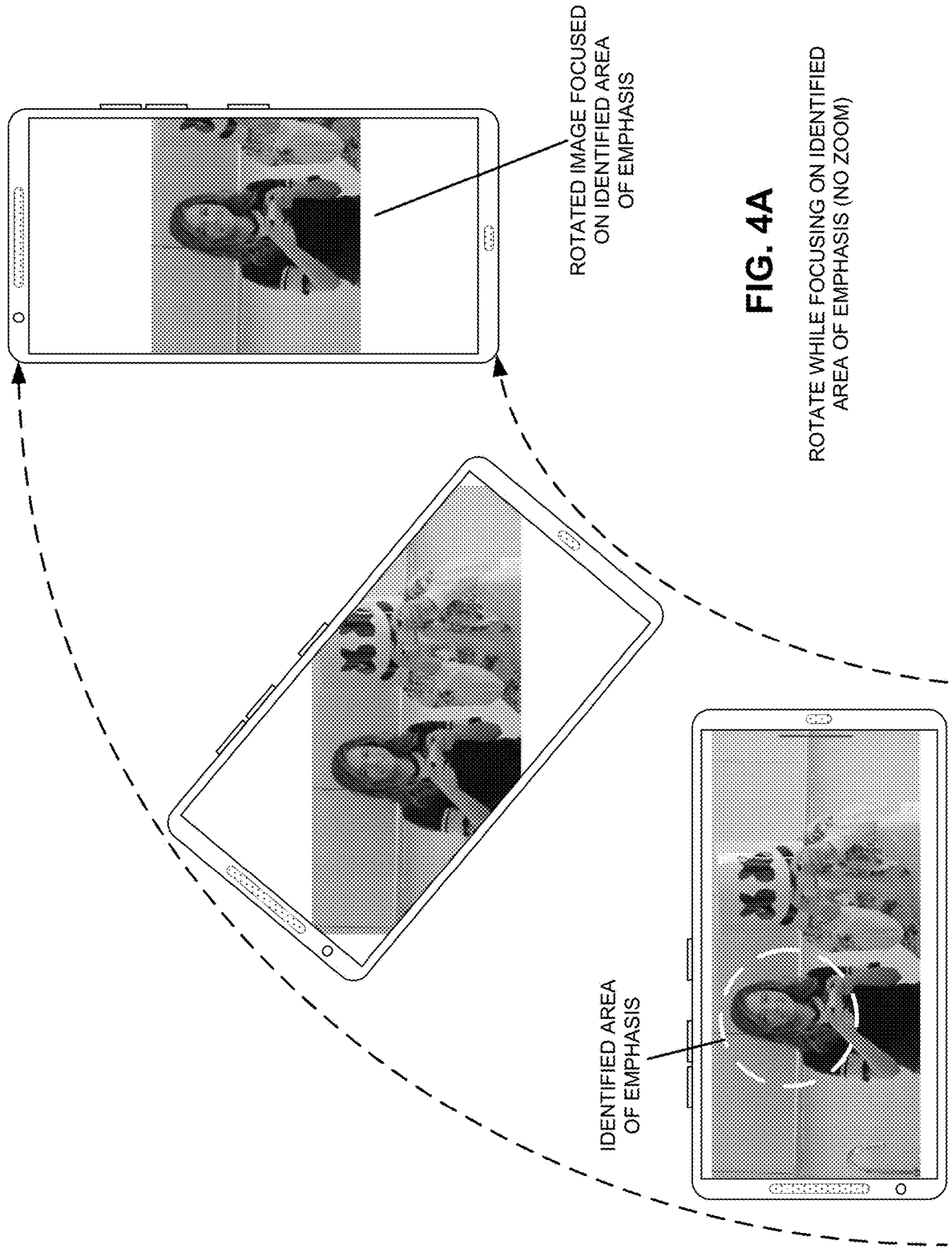

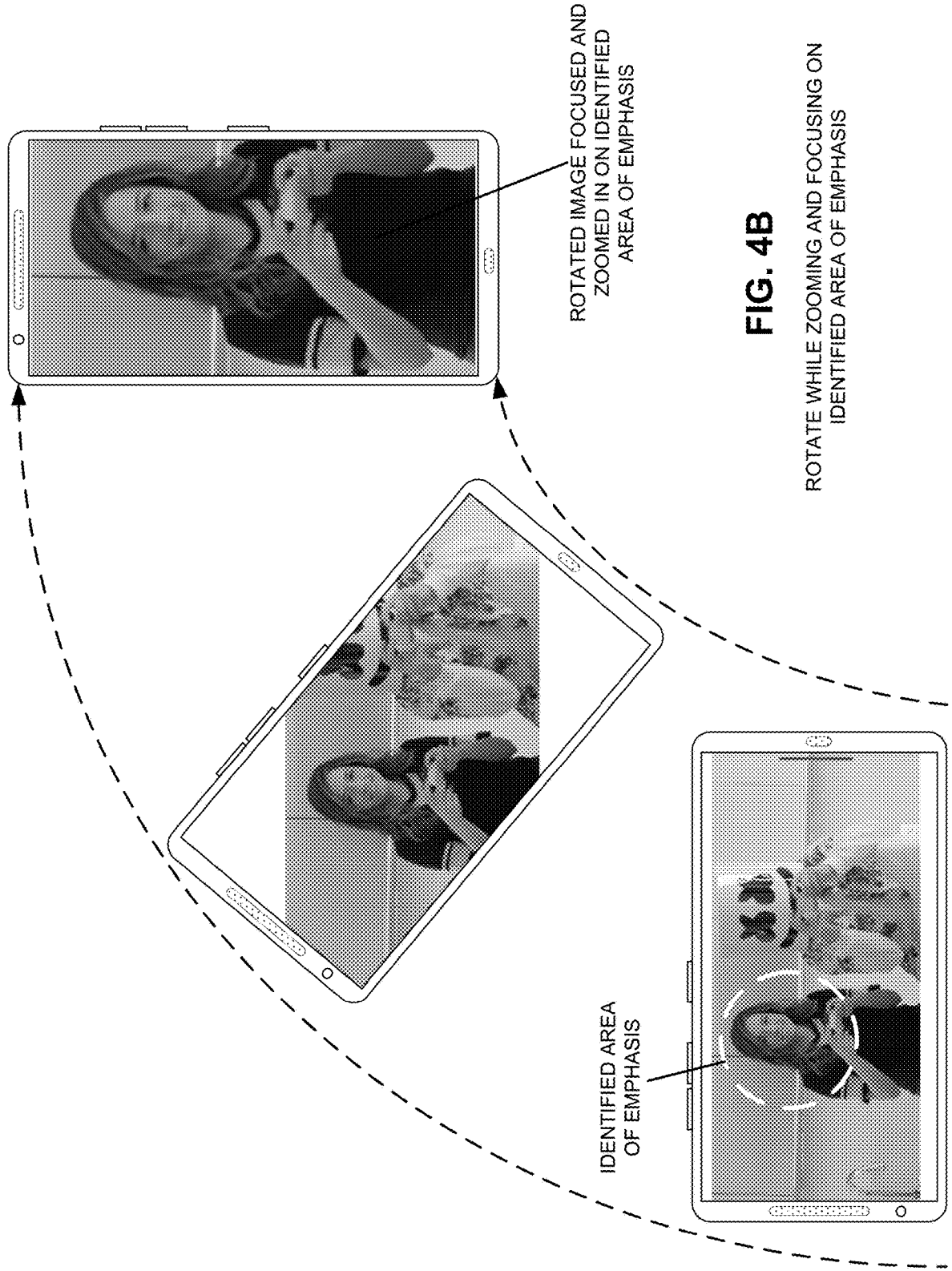

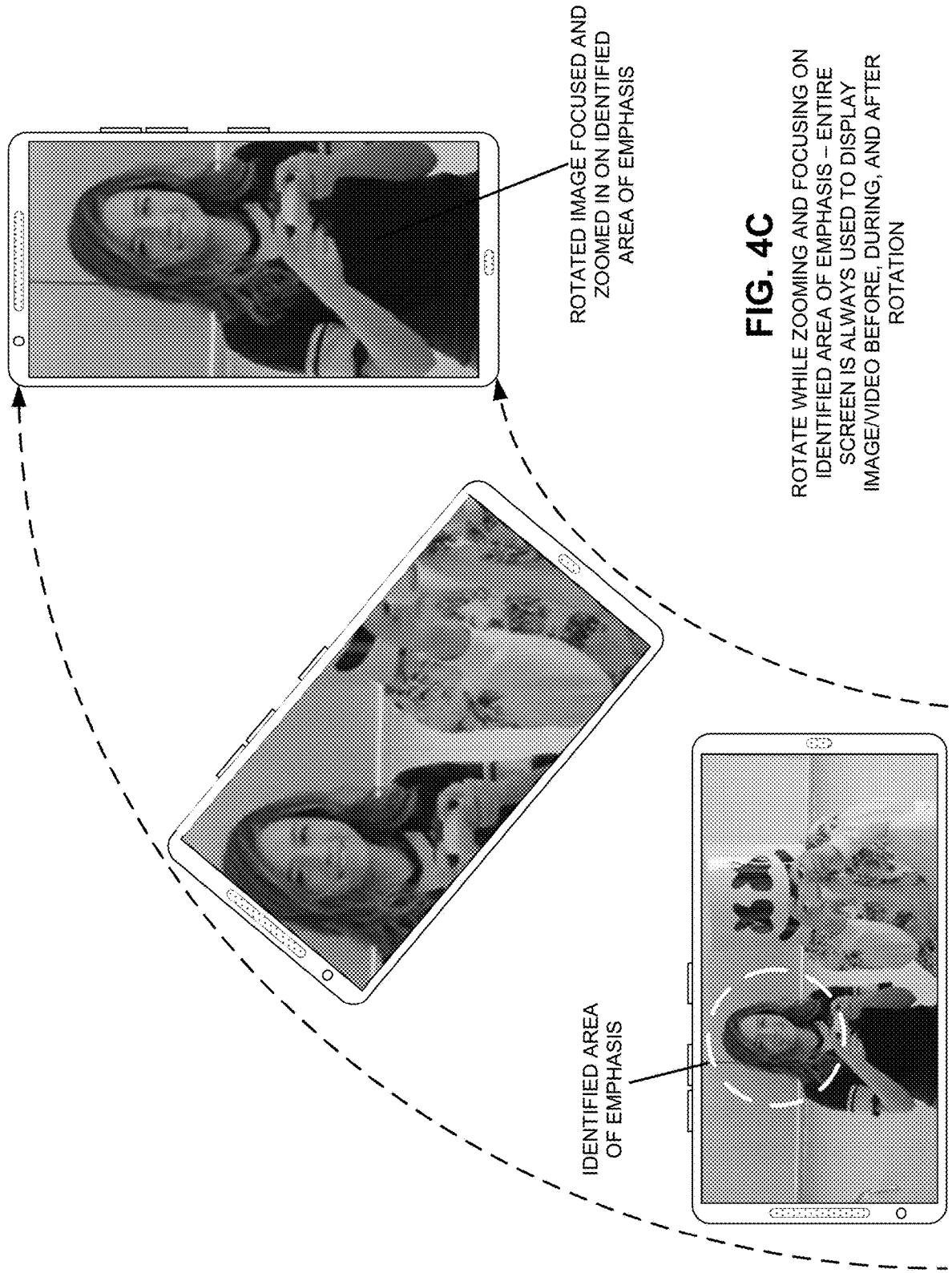

ROTATE AND ADJUST IMAGE USING CONTEXT AWARE IMAGE RESIZING TO FIT TARGET ORIENTATION

ROTATE AND ADJUST IMAGE USING CONTEXT AWARE IMAGE RESIZING TO FIT TARGET ORIENTATION

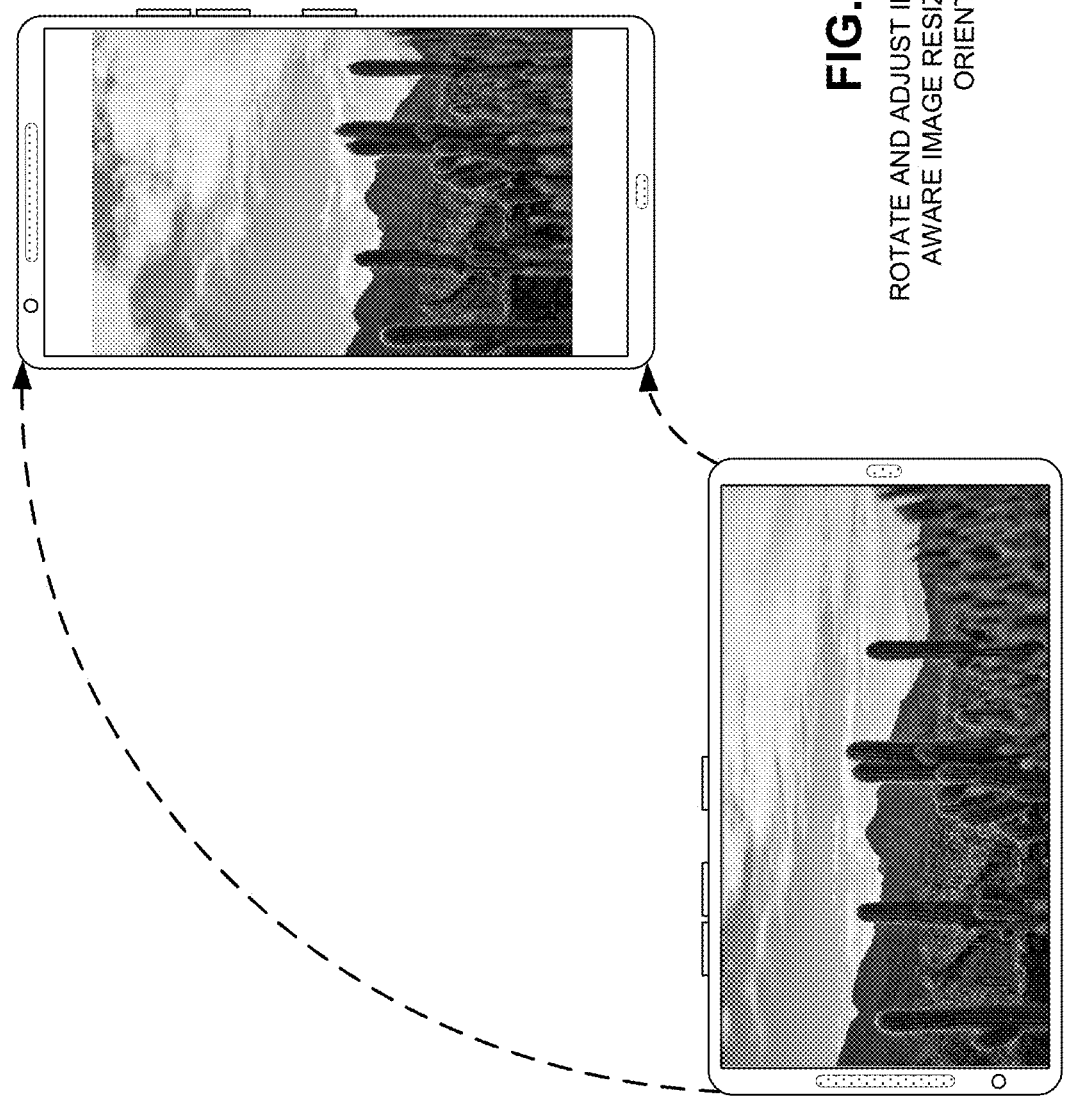

TECHNIQUES FOR OPTIMIZING THE DISPLAY OF VIDEOS

BACKGROUND

Related Application

This application is a continuation of pending U.S. patent application Ser. No. 17/119,980, entitled "Techniques for Optimizing the Display of Videos," by inventor Guy Ravine filed on 11 Dec. 2020. U.S. patent application Ser. No. 17/119,980 is a continuation-in-part of U.S. Pat. No. 11,038, 939 (previously U.S. patent application Ser. No. 15/530, 611), entitled "Analyzing Video, Performing Actions, Sending to Person," by inventor Guy Ravine filed on 6 Feb. 2017. U.S. patent application Ser. No. 15/530,611 is a continuation of U.S. Pat. No. 9,565,226 (formerly U.S. patent application Ser. No. 14/180,169), entitled "Message Capturing and Seamless Message Sharing and Navigation," by inventor Guy Ravine and filed on 13 Feb. 2014. U.S. Pat. No. 9,565,226 claims priority under 35 U.S.C. § 119(e) to U.S. Provisional Patent Application No. 61/764,517, by inventor Guy Ravine, entitled "Seamless Video Sharing and Navigation Technique," filed 13 Feb. 2013. U.S. patent application Ser. No. 17/119,980 also claims the benefit of U.S. Provisional Patent Application No. 62/942,205, by inventor Guy Ravine, entitled "Techniques for Optimizing the Display of Videos," filed 1 Dec. 2019. The contents of all of the above-referenced applications are hereby incorporated by reference.

FIELD OF THE INVENTION

This disclosure generally relates to techniques for improving the display of video streams on a computing device. More specifically, the disclosed techniques relate to optimizing the display of videos on the limited screens of mobile computing devices.

RELATED ART

Ongoing advances in mobile computing devices and high-speed networks have led to the widespread recording, sharing, and viewing of videos on mobile devices. Unfortunately, viewing videos on the limited-size screens of mobile devices can be challenging. A common problem today is that some videos are recorded horizontally and that some videos are recorded vertically, and auto-rotation options that attempt to adjust the display of videos that do not match a device screen orientation are typically binary and/or unwieldy. Another issue is that if the portion of the video that is of interest to the user is displayed in a small proportion of the screen, mobile device screen-size limitations may make that portion of interest too small to be clearly seen by the user. Furthermore, a user who is presented with a large set of videos may have difficulty in determining and navigating to the portions that are relevant and interesting; the challenge of exploring video content only increases as the amount of available video content grows.

Hence, what is needed are techniques for providing video viewing and enhancement solutions without the above-described problems of existing techniques.

SUMMARY

The disclosed embodiments disclose techniques for optimizing the display of videos. During operation, a computing device receives a video stream to be displayed. The computing device determines a preferred orientation for the video stream, determines a present orientation for the computing device, and determines a mismatch between the preferred orientation and the present orientation. The computing device adjusts the video stream while displaying the video stream on the display. As the video stream plays, the computing device detects any rotation of the computing device, and if so, re-adjusts how the video stream is displayed.

In some embodiments, the computing device detects that it is being rotated from the present orientation by a number of degrees. In response, the computing device rotates the displaying video stream (as it continues to play) the same number of degrees in the opposite direction from which the computing device has rotated to ensure that the video stream remains at the same viewing orientation from the perspective of a user of the computing device who is viewing the rotating computing device. Counter-rotating the displaying video stream in real time maintains a constant orientation of the video stream from the perspective of the user as the computing device rotates.

In some embodiments, the video stream can be displayed at any arbitrary angle with respect to the display. Incrementally rotating the displaying video stream in a non-binary manner as the user rotates the computing device facilitates keeping the playing video stream in the original user perspective as the device rotates and reduces viewing disruption and confusion as the computing device is rotated.

In some embodiments, the video stream is initially displayed zoomed out to fit in the display because of the orientation mismatch. As the display incrementally rotates, the displayed size of the video stream is incrementally increased such that when the computing device has been rotated to a final orientation the displayed size of the video stream matches the preferred orientation, and the video stream completely fills the display.

In some embodiments, the video stream is initially displayed zoomed in, displaying a cropped portion of the video stream at a scale at which the video stream would be displayed if the preferred orientation and the present orientation were matched in orientation. As the computing device rotates, the displaying video stream incrementally counter-rotates maintaining the scale of the video stream (e.g., the displayed size of the video stream remains the same during rotation). Maintaining the scale of the displaying video stream throughout the rotation results in the video stream substantially filling the display when the display is rotated to a final orientation that matches the preferred orientation (with some potential minor adjustments, slight padding and/or cropping to account for if the aspect ratios of the video stream and the display do not match exactly).

In some embodiments, the video stream is initially zoomed in and cropped such that an uncropped portion of the video stream completely fills the display (e.g., leaving no blank space in the display). As the computing device rotates, the video stream is incrementally zoomed out so that when the computing device has been rotated to a final orientation that matches the preferred orientation the video stream is substantially uncropped (e.g., except for minor adjustments due to aspect ratios not matching) and fills the display.

In some embodiments, the video stream is adjusted leveraging orientation information to maximize the number of pixels in the display that are displaying portions of the video stream. Maximizing the portion of the display that is displaying the video stream minimizes blank areas of the display in which no portions of the video stream are playing and hence improves the user viewing experience for the video stream.

In some embodiments, the disclosed techniques further minimize blank areas of the display by leveraging edge extrapolation techniques that seamlessly expand portions of the video stream into otherwise blank areas of the display.

In some embodiments, prominent activity analysis is used to determine one or more areas of emphasis in the video stream. The system focuses on displaying these determined areas of emphasis before, as, and after the computing device rotates.

In some embodiments, adjusting the video stream comprises simultaneously: (1) continuously determining and analyzing areas of emphasis in the video stream; (2) adjusting the video stream on the display to focus on the determined areas of emphasis; (3) adjusting the scale of the video stream to at least one of zoom in or zoom out the video stream; and (4) rotating the video stream in an incrementally in a non-binary way to counter the rotation of the computing device.

In some embodiments, prominent activity analysis involves detecting one or more active faces in the video stream and ensuring that the active faces in the video stream are featured in the portion of the video stream that is displaying on the display before, as, and after the computing device rotates.

In some embodiments, ensuring that the active faces in the video stream are featured in the displayed portion of the video further comprises not zooming in the video stream fully to ensure that all of the active faces in the video stream remain visible in the display, at the cost of leaving some portions of the display unused.

In some embodiments, rotating the displaying video stream further involves using tracking mechanisms in the computing device to determine whether the user's orientation relative to the computing device is changing. Only if it is determined that the computing device is rotating independently of any changes in the user's orientation is the displaying video stream rotated.

In some embodiments, seam-carving techniques are applied in one dimension of the video stream to seamlessly expand that dimension of the video stream to minimize blank space on the display. Seam-carving techniques can also (either simultaneously or separately) be applied in one dimension of the video stream to seamlessly condense that dimension of the video stream to ensure that a determined area of emphasis in the video stream fits onto the display while also minimizing blank space on the display.

In some embodiments, indication is presented to a user of the computing device to indicate that the video orientation and the present orientation are mismatched and that rotating the computing device will improve viewing characteristics for the video stream on the computing device.

In some embodiments, the computing device is used to display a queue of multiple video streams. Displaying these multiple video streams involves detecting the orientation of the multiple video streams and then grouping the video streams by orientation to reduce the number of device rotations and adjustments needed when viewing the multiple video streams, hence minimizing user overhead and unused screen space on the display.

BRIEF DESCRIPTION OF THE FIGURES

FIG. 1A illustrates how a horizontally-oriented video being displayed on a vertically-oriented device leaves large portions of the screen unused.

FIG. 1B illustrates binary rotation of video orientation.

FIG. 2A illustrates an example of non-binary video rotation that continues to play the video in incrementally-diagonal orientations and zooms in on the video during rotation in accordance with an embodiment.

FIG. 4A illustrates an exemplary scenario in which a video with an identified area of emphasis is rotated in accordance with an embodiment.

FIG. 4B illustrates an exemplary scenario in which a video with an identified area of emphasis is rotated and zoomed in to the area of emphasis during the rotation in accordance with an embodiment.

FIG. 4C illustrates an exemplary scenario in which a video with an identified area of emphasis is rotated and zoomed aggressively in to the area of emphasis to ensure that there is no blank space in the screen during the rotation in accordance with an embodiment.

FIG. 6C illustrates a third example in which context-aware image-resizing techniques are applied to a video stream in accordance with an embodiment.

DETAILED DESCRIPTION

Figure 2B:
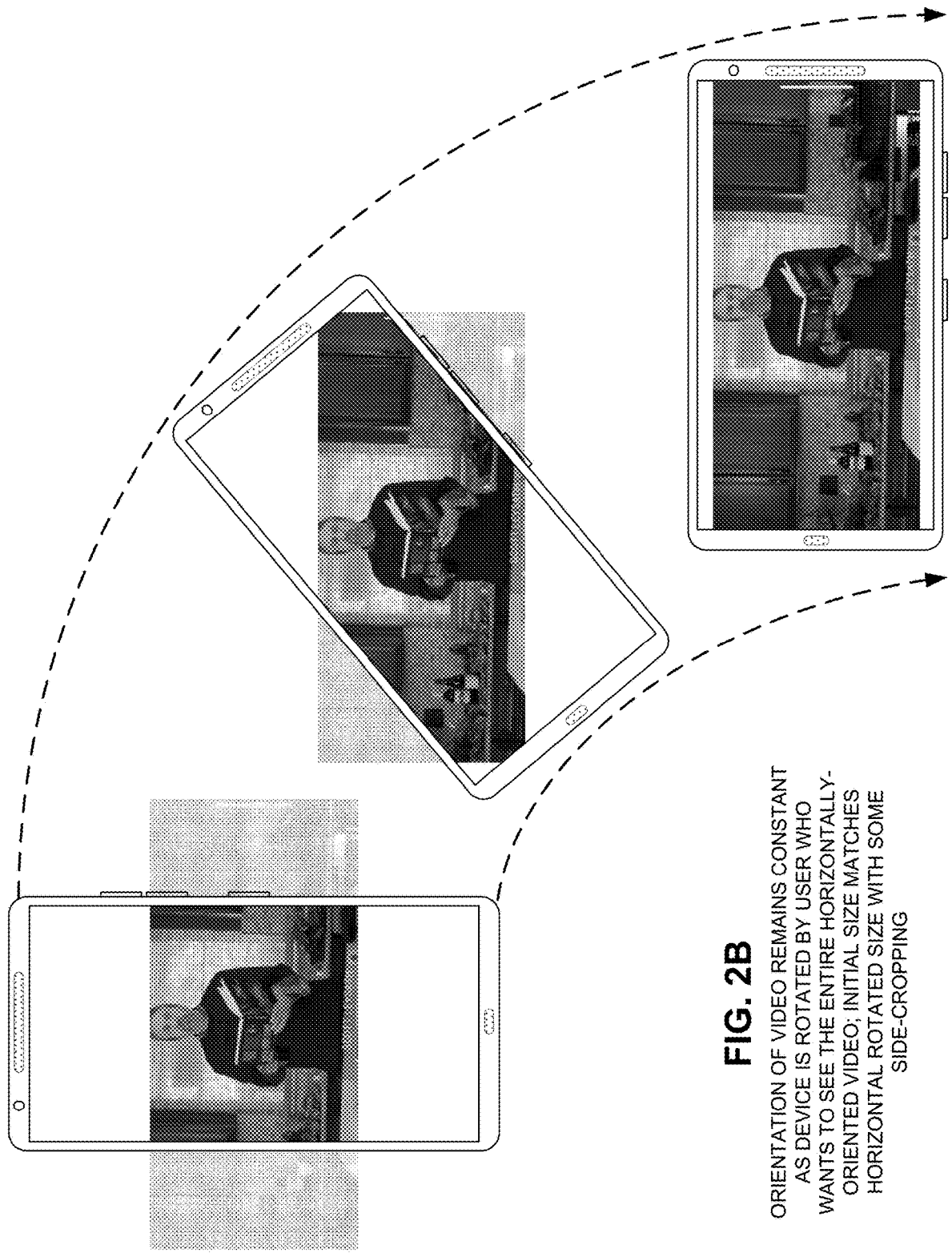
FIG. 2B illustrates an example of non-binary video rotation for a scenario in which a vertically-oriented display initially displays the center of a horizontally-oriented video at the same size as it would display if horizontally-oriented in the display in accordance with an embodiment.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, a full-custom implementation as part of an integrated circuit (or another type of hardware implementation on an integrated circuit), field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Optimizing the Display of Videos

The following description discloses a number of techniques that facilitate optimizing the display of videos. Such techniques can be applied either independently or in conjunction with each other to improve the creation and/or viewing of videos on mobile devices. For instance, the following sections disclose techniques for: (1) improving the process of recording and sharing videos; (2) overcoming orientation issues in the playback of videos; (3) determining and adjusting the focus for a video to optimize the use of limited device screen space; (4) predictively regenerating a video to fit specific screen orientations and constraints; (5) performing edge extrapolation to fill blank space; (6) extracting a summary of a video; and (7) extracting components from videos to generate new composite videos.

Recording and Sharing Videos

In some embodiments, communications devices include video capture capabilities that facilitate instant, automated video communication. Videos may be captured using a camera or a device coupled to a camera, such as, but not limited to, mobile phones, tablet computing devices, laptop or desktop computers, optical head-mounted devices, watches, and wearable computing devices, as well as any other device suitable for capturing images. Captured videos may be shared with friends and family by sending video files between users or by posting videos on the Internet. These videos may be organized individually based on information such as titles and/or require a specific hyperlink to view the video. A user may be notified that a video has been posted or received. The video may be accessed and rendered on a device, such as a mobile phone. Messages, such as video messages and the like, may be shared among a single user, multiple friends, families, or groups in an efficient manner to provide engaging, immersive, and organized communications. Recorded video messages may be transmitted and directed to one or more users as part of a video message "conversation."

Users accessing shared video messages may receive a video stream of multiple video messages that may be presented in an organized manner and played back in a substantially seamless manner. As used herein, seamless can mean continuous and/or uninterrupted. In one example, multiple videos from multiple users may be stitched together in a chronological order to create the seamless video stream. In one aspect, the video stream, when played back, can appear to be similar to a conversation, a television broadcast, or a video channel, thereby presenting the video messages in a way that the discussions and messages can be understood and followed easily. Accordingly, generating and providing video streams by stitching multiple video messages from multiple users can provide users an engaging experience.

In some embodiments, video communication techniques include efficient techniques for automatically capturing, sharing, and distributing video messages. For example, in one particular example, a first device may detect that a first user intends to create a video message and, in response, captures the video message automatically. Furthermore, the first device can process the video message and determine recipients ("targets") of the video message and automatically send the video message to the detect targets. Further yet, a second user using a second device may receive that the video message from the first user. The second user device may monitor sensor inputs to detect whether the second user is ready to watch the video message. Based on the sensor inputs, the second device can automatically playback the video stream of the video message when it detects that the second user is ready to receive the video message. As a result, various embodiments may reduce the amount additional inputs that users provide in order to share and view video messages In some embodiments, incoming video messages are played automatically when a recipient holds up and looks at a phone. The user's response is detected when user begins to speak, and the response is sent automatically to the sender of the received video message. Thus, sensor input as well as speech input inside a message is used to send messages to specific people without manually sending a response message.

In some embodiments, a message is recorded beginning from when a user begins to speak. For instance, the beginning (or any other portion) of the message can be scanned to determine who the user is referring to and the message is sent it to that user. For instance, in the message, "hey Andre, wanna come to the ball game?" the audio is converted to text using a speech-to-text software conversion, the name Andre is recognized, based on a history of messages by the user, to correspond with an individual named Andre, and sends the message to Andre. The user can also refer to a group, or to multiple people, or to all his friends, and the message is sent to multiple destinations. In another example, a video processing system may initiate video message capture upon a voice command to post or share a video message request from the user. For example, the voice command may include "start video message to Mike," to initiate a video message capture that will be sent to Mike. The capture may also be initiated based on a combination of inputs such as a combination of positional and touch input. For example, a "capture" position of the computing device may be detected along with a particular touch input. One example capture position is the camera being held in a landscape orientation and facing a direction substantially parallel (e.g., within about 30 degrees from parallel) to the ground.

Similarly, after a recipient John is notified of a video message, John's computing device may be configured to begin playing the message when it is detected that John has held up the device and, through facial recognition, it is determined that John is looking at his device. The message begins to play automatically. John can then reply back immediately to Andre by beginning to speak back to his phone as if speaking back to Andre. Hence, in one aspect, the present invention provides a method of generating and sending a message, including determining that a user is holding a smart phone and looking at the smart phone; recording the user speaking into the smart phone as a video message containing audio; analyzing the audio and/or video contents to determine a recipient; and sending the video message to the recipient at the destination. Such techniques can involve determining that the user is holding a smart phone, performing facial recognition on images captured by the smart phone (e.g., performing facial recognition on images captured by the smart phone and matching the images to the user's face), and then playing a received video message to the user.

In some embodiments, a video processing module in a computing device may be configured to: (1) generate a transcript of a video message by performing a speech-to-text algorithm to the audio of the video message; and then (2) identify user names mentioned within the transcript to determine automatically one or more target users of the video message (e.g., a contact to whom the video message is to be sent), or to determine keywords automatically to be included in the metadata associated with the processed video message. Such keywords can be used for searching purposes, to notify the mentioned users that a video message makes reference to the mentioned users, and/or to automatically perform a task (e.g., such as calendar an event, add items to a wish list, etc.). This video processing module may also be configured to monitor substantially real-time video provided by a camera to automatically capture, share, and/or display video messages. Based on the images and/or audio of the video, the video processing module may record a video message, display a received video message, and/or the like.

For instance, a video capture may be initiated based on preset conditions such as a timer or upon recognizing certain conditions. For example, the capture may include facial recognition whereby the video message capture is initiated upon recognition of a particular person. Some of the techniques mentioned above and others may require the camera to capture video as a background process of the device. For example, the camera may continuously capture a video such that a user may initiate a command for sharing, for example, a video of the last 30 seconds. In another example, the camera may begin video capture when it is detected that a user begins speaking and may end capture when it is detected that the user has stopped speaking. The video message capture may also pre-capture video such that a user may include a voice command such as "send the last 30 seconds of video to Mike." The video message capture may also parse out portions of the video that are used for initiating the video or particular voice commands. In the example above, the "send the last 30 seconds of video to Mike" may be removed from the captured video. Another example may involve using a voice command "send video to hockey team" that instructs the device to send the video message to members in the user's hockey team group.

To increase the functionality and seamlessness of video capture, minimized input requirements may be utilized. For example, a unique input command may be recognized as initiating video capture and/or sharing regardless of the current application running of the device. For example, a unique touch, gesture, or voice command may be recognized in order to initiate video capture. In addition, in order further increase seamlessness, the captured video may automatically be sent to a designated user without further input. For example, video may be sent automatically to the last user involved in a communication or the user may be designated based on predefined conditions or other criteria. These techniques may also include facial, and/or voice recognition. For example, the device may determine that a particularly user appears or is referenced in a particular video message, and accordingly, shares the video message with the identified user.

In some embodiments, a set of video messages shared by multiple users may be "stitched" together one after the other to improve the seamless experience of multiple video messages. A streamed video message may comprise separate video message files that are accessed individually and displayed and/or buffered in a manner to produce a continuous seamless video stream. In another example, multiple video files may be combined into a single video file which produces a continuous video stream. In another example, multiple videos may be written to a file as they are received to produce a continuous video stream. Stitching may also occur in real-time or in an on-demand fashion. In some embodiments, the video stream may also be stitched together based on a video conversation. For example, a user may send a video message to a friend, and the friend may respond with a video message, which may be similarly to a video "walkie talkie" conversation. Accordingly, a created video stream may switch between each user as they respond to generate a seamless video of the conversation.

In some embodiments, an incoming video message may be played automatically when a sensor interface module detects that a user is ready and is in a position to view the message (e.g., the user is holding and looking at the device) rather than when the video message is received. Accordingly, the video message may begin playing automatically based on a position of the computing device (e.g., also via the sensor interface module). For example, upon a notification, the device may detect a "viewing" position (i.e., the device is held up into the line of sight of the user). Detection can be based on facial recognition techniques provided by a camera interface module and/or a video processing module in the computing device. This determination may also take into account timing. For example, automatic playback can be performed in response to detecting a viewing position within predetermined number of seconds (e.g., within about 30 seconds) of receiving the notification, and for at least predetermined amount of time (e.g., greater than about 3 seconds).

In some embodiments, the audio of a video message is transcribed to a text based representation ("a transcript") either during or after the recording of the video message. Some (or all) portions of this transcript can then be searched to determine and/or order potential targets for the video message (e.g., contacts, groups, channels, etc.). In some embodiments, the video message can be sent to the selected target without prior confirmation from the user to send the message. Alternatively, the identified parties may be notified that they have been mentioned in the message. For example, in a group communication involving multiple users receiving multiple messages from the group, the users may receive notifications of social messages in which the respective users were mentioned, or choose to view only messages in which they were mentioned.

Video Sharing Example

Figure 12:
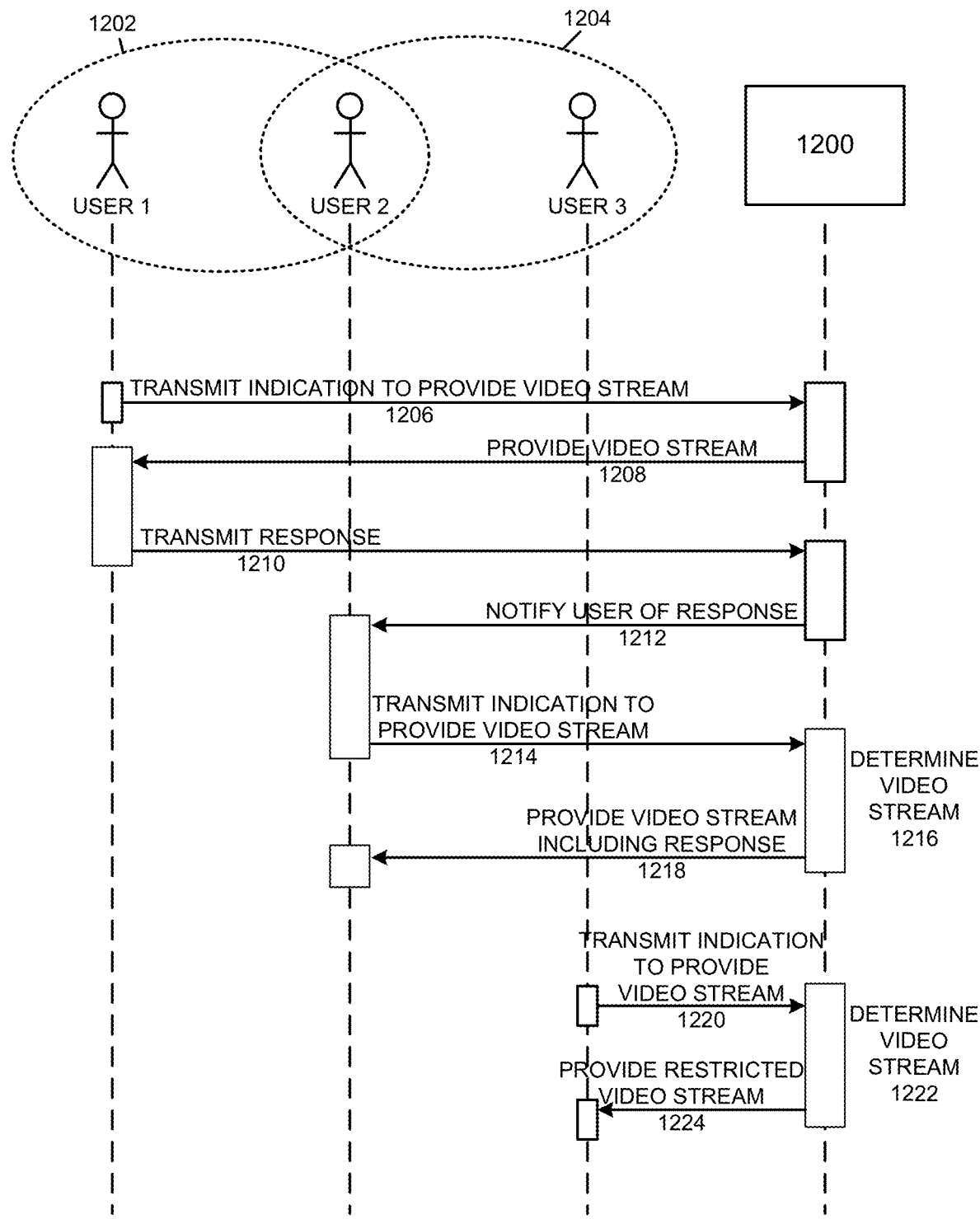
FIG. 12 illustrates an interaction diagram that illustrates an example use case of multiple users providing and receiving video messages from a communication system in accordance with an embodiment.

FIG. 12 is an interaction diagram illustrating an example use case, according to an embodiment, of multiple users providing and receiving video messages a communication system. In particular, FIG. 12 illustrates interactions of multiple users (e.g., User 1, User 2, and User 3) communicating video messages in a video message system 1200. In the illustrated embodiment, User 1 and User 2 can be included in a user group 1202 and User 2 and User 3 can be included in a user group 1204. As will be described below, the user groups 1202, 1204 may correspond to social graphs of a social network. For example, the user group 1202 may correspond to User 1 and User's connections (e.g., "friends"). In a similar way, the user group 1204 may correspond to User 2 and User 2's connections. However, as stated, in alternative embodiments, the user groups 1202, 1204 can each correspond to other types of user groups, including, but is not limited to, other suitable social network groups, graphs, or message feeds, among other types of user groups. Furthermore, additional users and/or groups (not shown) may be included.

Figure 7:
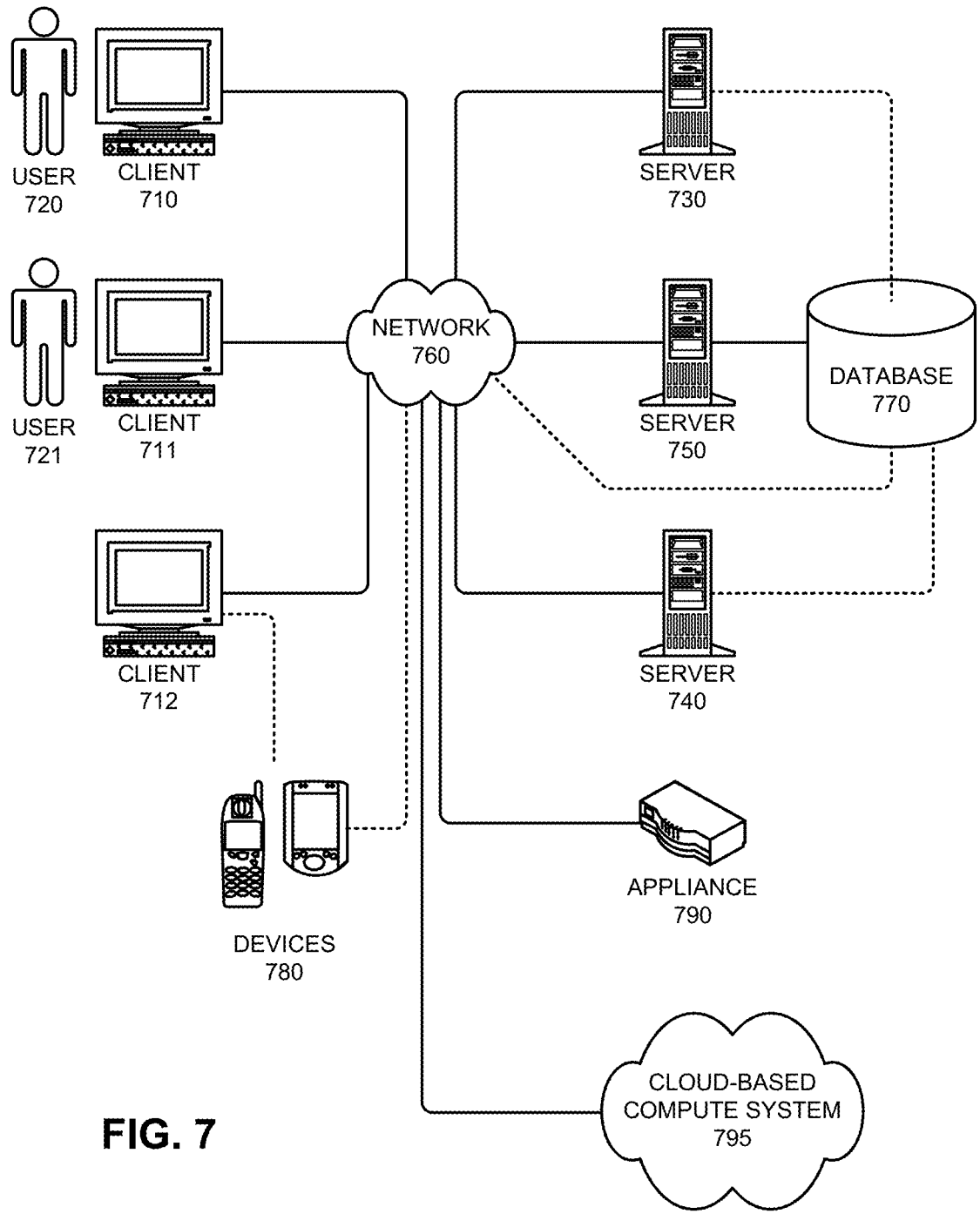
FIG. 7 illustrates a computing environment in accordance with an embodiment.
Figure 8:
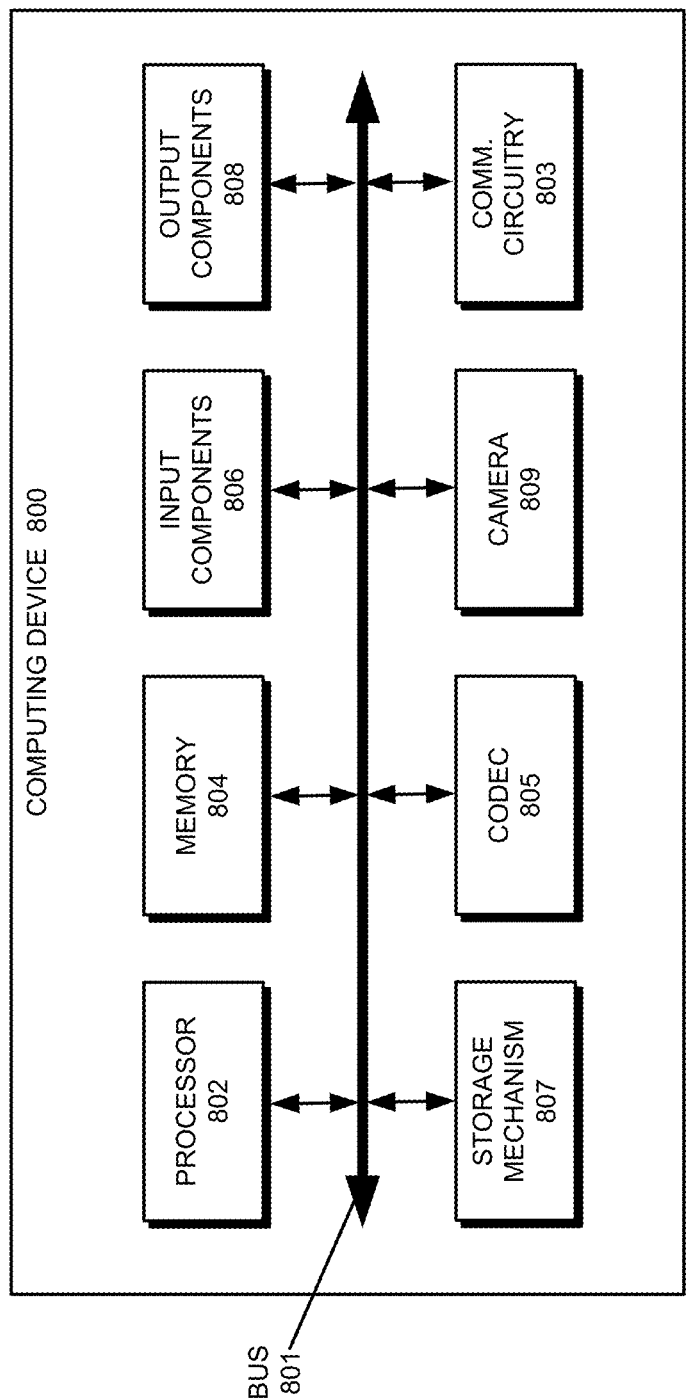
FIG. 8 illustrates a computing device in accordance with an embodiment.

In the illustrated use case of FIG. 12, each of User 1, User 2, and User 3 can correspond to one of various devices, such as the computing devices illustrated in FIGS. 7-8, and the video message system can be part of a communication system. While the description of the illustrated interactions will be described below in the context of a client-server relationship between User 1, User 2, User 3, and the video message system 1200, it will nonetheless be appreciated that other types of relationships can be chosen. For example, the various operations described below can be performed by any suitable user or the components of the video communication system.

At operation 1206, User 1 may transmit to video message system 1200 an indication to provide a video stream. For example, User 1 may use the computing device 800 of FIG. 8, which may be executing a software application for supporting video messaging services, to transmit the indication. The indication may correspond to a direct request from user, an automated response to request a video stream (such as computing device 800 detecting User 1's attention), and/or a search request, among others. Furthermore, the indication may be a request to view video messages associated with a particular user group, such as the user group 1202 (e.g., User 1 and User 2), or any other suitable user group. In some embodiments, User 1 need not belong to the user group in order to request a video message from the user group.

The indication can be provided for pushing or pulling the video message to User 1. For example, in a pull embodiment, the indication may be provided by User 1 as a request to the video message system 1200 to provide the video stream. In alternative embodiment, the indication can be provided in response to the video message system 1200 providing a first indication for providing the video stream as an acknowledgment that User 1 is ready for receiving the video stream.

At operation 1208, in response to receiving the indication from User 1, the video message system 1200 may provide User 1 a video stream. In particular, the video message system 1200 may select a plurality of videos viewable by User 1. A video may be viewable to User 1 based on the user groups that User belongs to. For example, certain videos are viewable be only certain user groups or users. Accordingly, in the illustrated embodiment, the video message system 1200 may select videos messages that were targeted or otherwise associated with user group 1202. Additionally or alternatively, one or more of these videos may be omitted based on permission attributes of the omitted video messages and/or User 1.

Of the selected videos, video message system 1200 may determine an order. For example, the selected video messages may be ordered chronologically from the oldest message to the newest message. The video stream may be provided in either a streaming or downloading manner. Furthermore, the video stream may be generated as a separate file, and the separate file can be provided to User 1. As stated, in an alternative embodiment, the video stream may be provided by providing the video messages one at a time in the determined order. The video messages may be provided in a continuous manner (e.g., without substantial interruption).

At operation 1210, User 1 may transmit a video message to video message system 1200. For example, the video message transmitted at 1210 may be a video response to one of the videos of the video stream. In particular, the video response may be a reply to a video provided by User 2. The video response may include one or more privacy, permission, privilege attributes that may be used to determine which users may view the response, may respond to the response, may share the response, may comment on the response, and/or the like.

At operation 1212, in response to receiving the video message, video message system 1200 may notify one or more users of the received video. For example, video message system 1200 may notify each user to whom the video response is directed to either directly or indirectly (e.g., in a threaded conversation of multiple users). In alternative embodiments, other suitable notifications may be sent, for example, to users of groups that include User 1 and/or User 2.

At operation 1214, in response to receiving the notification of the new video message, User 2 may transmit to video message system 1200 an indication to provide the video message and/or a video stream. At operation 1216, video message system 1200 may update or determine a video stream that can be viewable by User 2. For example, video message system 1200 may determine a video stream by adding the response video to the previous video stream such that the video stream provides the videos chronologically. In other embodiment, the video stream to be provided to User 1 can include videos messages from one or more of the user groups associated with User 2, e.g., user groups 1202, 1204. In this way, the video stream of User 1 may be substantially different from the video stream provided to User 2. At operation 1218, video message system 1200 may provide the updated video stream to User 2.

At operation 1220, User 3 may transmit to video message system 1200 an indication to provide the video message and/or a video stream. At operation 1222, video message system 1200 may update or determine a video stream that is viewable by User 3. In the illustrated embodiment, the video stream determined for User 3 may or may not include the video response of User 1 that was provided at operation 1210. Whether or not the video response is included may be based on the privilege, permission, and/or security attributes of User 1, User 3, the video response, and/or the user groups 1202, 1204.

In one example embodiment, User 3 may be a subscriber to the message feed of user group 1202. In this case, User 3 may view video streams including the videos posted by the users of user group 1202. In some embodiments, User 3 may have read-only access and/or read-write access to the video stream of user group 1202. At operation 1224, the video message system 1200 may provide a video stream viewable by User 3.

Overcoming Orientation Issues

A common problem today is that some videos are horizontally-oriented and some videos are vertically-oriented. This is an issue particularly on mobile devices, which often have limited screen sizes and elongated screen aspect-ratios. Consider services like YouTube™, where a user typically holds a device horizontally to watch horizontal videos and can swipe through horizontal videos horizontally, or TikTok™ and Snapchat™, where all of the videos are vertical and a user swipes through vertical videos. Such services are very limited in situations where they are geared towards one orientation and receive videos in the non-preferred orientation. For instance, a vertically-oriented player playing a horizontally-oriented video stream typically fills the horizontal portion of the middle of the screen but leaves large portions of the screen above and below that horizontal portion unused (as illustrated in FIG. 1A). Similarly, a horizontal player playing a vertically-oriented video typically leaves the portion to the right and left of the video blank. Such existing solutions are lacking because they only make use of a small subset of the phone display area that is available to play the video.

As mentioned above, FIG. 1A illustrates an exemplary scenario in which a user is viewing the screen of a mobile device in a vertically-oriented position and opens a horizontally-oriented video (e.g., perhaps the user was watching a vertically-oriented video and then swiped on to the next video, which happens to be a horizontally-oriented video). Current solutions would just display that horizontal video in a tiny portion of the screen, as illustrated in FIG. 1A.

FIG. 1B illustrates binary rotation of video orientation. Devices that support rotation and/or auto-rotation can switch the video play from one orientation to another (as illustrated in FIG. 1B), but this option is binary (e.g., only pure vertical or horizontal, with no in-between) and typically unwieldy. For example, because such rotation is based on the motion and orientation of the device, a user watching a vertically-oriented video while lying on their side may have the device (e.g., a phone) automatically rotate the video to the narrower horizontal orientation because the side of the phone is oriented upwards in that position. These two binary options (horizontal vs vertical) are separated with awkward snap-to transitions (e.g., if the phone angle passes 45 degrees, the displayed video stream is rotated), and there has been no elegant interface that allows the two orientations to exist and/or be switched in an intuitive way.

Embodiments of the present invention strive to optimize the display of videos to make better use of available screen space and improve the rotation operation, thereby improving the user viewing experience. The disclosed techniques facilitate accommodating both a vertical and horizontal full-screen video experience that (1) ensures that a video's displayed image fills the screen as much as possible; and (2) maintains the same original position with respect to the ground (or some other specified reference, if desired).

In some embodiments, the orientation of a video (from the perspective of the user) is kept constant as the displaying device is rotated, by effectively rotating the video in a non-binary manner in relation to the displaying device as that device rotates (e.g., rotating a playing video in the opposite direction and magnitude of the device rotation). As a user begins rotating the device, the motion is detected through gyroscopes in the device. As the device rotates, the system maintains the orientation of the video in the original orientation (e.g., on a mobile phone, even though the phone is rotating, the video remains fixed with respect to the original starting orientation so that the user can continue to watch it straight on, without having to tilt their head).

In some embodiments, display techniques further comprise ensuring that a video being displayed will always fill the display screen (or fill as much as possible of the display screen) to minimize the blank areas of the screen in which no portions of the video are playing. For instance, when the display is oriented in a first orientation and the device receives notification that the next video is in the opposite orientation, the device may be configured to zoom in on a portion of the new video so that the displayed portion of the new video fills the entire display. For example, when displaying a vertically-oriented video on a vertically-oriented display, and receiving notification that the next video is horizontally-oriented, the device may be configured to zoom in on a portion of the horizontally-oriented video so as to fill the entire screen (e.g., effectively crop out portions of the sides of the horizontally-oriented video and then zoom in on the un-cropped portion so that effectively all of the screen displays portions of the video instead of displaying blank space).

To ensure that the entire device screen always displays video, the display system may gradually zoom a video that is being displayed as a user rotates a display between orientations. For instance, when displaying a horizontally-oriented video on a vertically-oriented display, the display system zooms in on a portion of the video (as described above). As the user rotates the display from a vertical to a horizontal orientation, the display system continues to fill the entire display, slowly zooming out, until the rotation reaches the horizontal orientation, where both the phone and the video are now both horizontally-oriented and the entire video fills the entire display (e.g., the orientation of the screen and the video that is being displayed now match in orientation). More specifically, as the device is rotated, the user can continue watching the video, which will appear fixed in space from the user viewpoint, as if the video (as viewed by the user) does not rotate as the device rotates. During this operation, the video is also gradually zoomed out to ensure the video always fully fills the screen, until the device is horizontal and the video fits completely 1:1 (or approximately 1:1, as sometimes some device displays will be wider or thinner and not exactly match the aspect ratio in which a video was displayed, in which case full screen display may involve cutting off some portions of the sides or the top/bottom as needed). Rotating a video in a non-binary manner in relation to the displaying device as that device rotates substantially reduces viewing disruption, in contrast with techniques that perform a binary horizontal/vertical (or vice versa) orientation rotation.

Figure 2C:
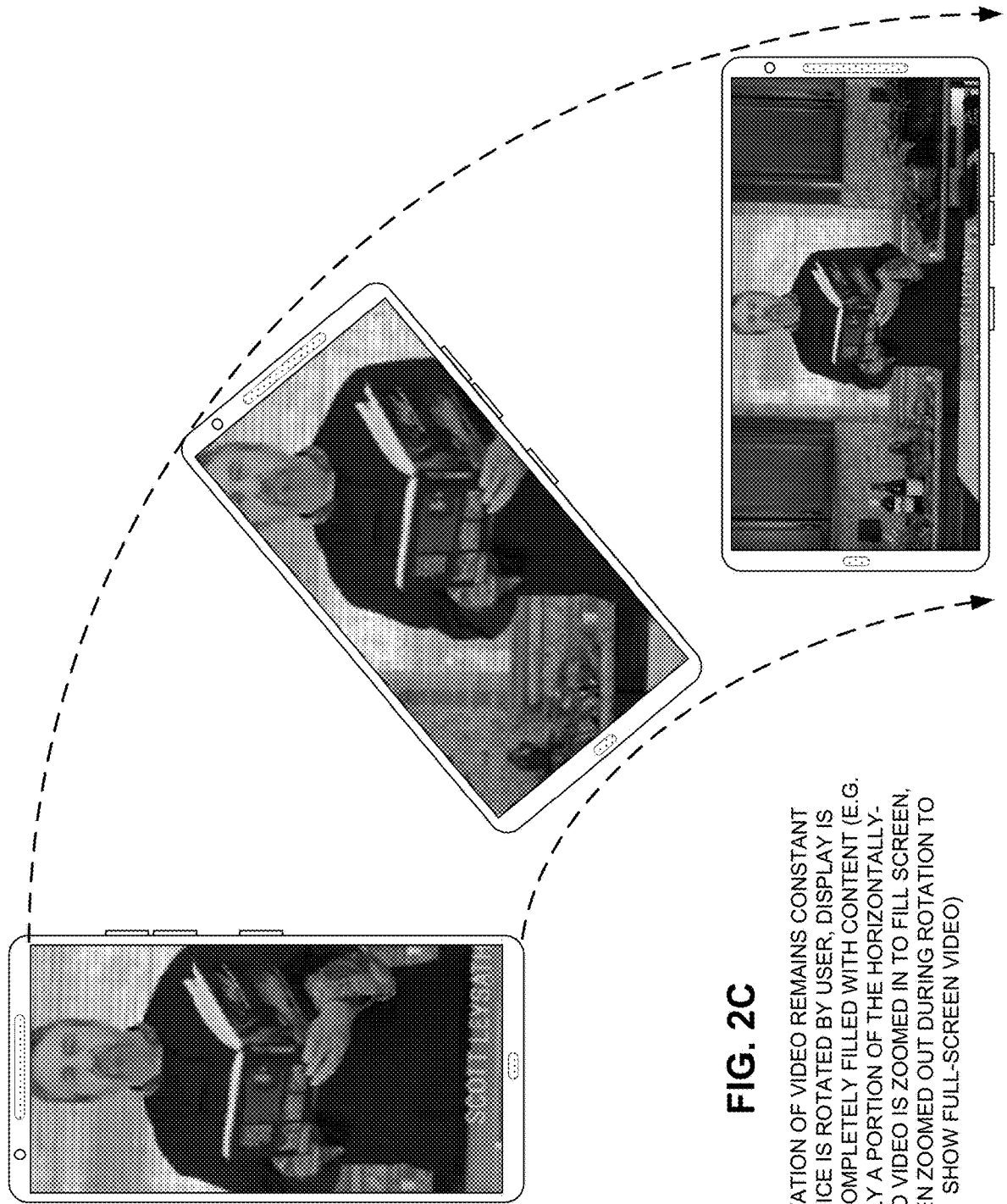
FIG. 2C illustrates an example of non-binary video rotation for a scenario in which a vertically-oriented display initially is filled with a zoomed-in portion of a horizontally-oriented video, and the horizontally-oriented video is then zoomed out to fill the display when the display is rotated into a horizontally-oriented orientation in accordance with an embodiment.

FIGS. 2A-2C illustrate several different examples that illustrate variations of the above embodiments for a horizontally-oriented video. FIG. 2A illustrates an example of non-binary video rotation. In FIG. 2A, a horizontally-oriented video is being watched on a vertically-oriented device; the entire video is displayed on the device screen, but substantial space above and below the displayed video is wasted (blank). As the user rotates the device, the video is still displayed horizontally from the viewer's perspective, but the device zooms in and expands the number of pixels that are used to display the video as more of the screen becomes horizontally available. When the device finishes rotating to a fully horizontal orientation, almost the entire screen is now being occupied by the video stream. Note that the video continues to play normally during the rotation (e.g., as illustrated for the intermediate diagonal rotation state, the video displays in what would be various, incrementally-angled diagonal orientations from the perspective of the top of the device as the device rotates). Note also that undisplayed portions of the video are included (shaded out, external to the computing device) in this and some subsequent illustrations to indicate portions of the video that are not being displayed. For FIG. 2A, the size of the displayed video is smallest when the computing device is oriented in a vertically-maximal orientation (e.g., a portrait orientation), and gets larger until the displayed video size is at a maximum size when the computing device reaches a horizontally-maximal orientation (e.g., a landscape orientation). Finally, note that while some of the figures illustrate rotation appearing as if the device is being moved in space as it is rotating, this is purely for illustrative purposes; the device may be moved in space while rotating, or can also simply be rotated in place (e.g., rotating the device in place such that the center of the display effectively does not move in the x, y, or z directions).

FIGS. 2B-2C are similar to FIG. 2A in terms of the initial viewing configuration, with a horizontally-oriented video initially being watched on a vertically-oriented device. In some embodiments, the device, upon detecting that the device and video being displayed are in opposite orientations, already optimizes the misaligned visuals that are being displayed to improve the user experience. For instance, when the device is vertically-oriented and a horizontally-oriented video is being displayed, the device can center the view on the middle portion of the video (or some other portion of the video, as described in subsequent sections); as the device rotates, the visual display may be zoomed back out to ensure that the video fully fills the device screen when the device and video orientations match.

FIG. 2B illustrates an example in which the center portion of a video (the same video from FIG. 2A) is centered and sized to the same size that it would be displayed if it were being displayed full-screen on the device in a fully horizontal orientation. Note that as in FIG. 2A, FIG. 2B illustrates a shaded portion of the video that does not fit on the screen because of this (e.g., is effectively cropped out). In this example, no zoom is needed when rotating, the illustrated person illustrated in the vertical orientation is the same size as in the final (right-most) rotated video in the horizontal orientation and all intermediate orientations (unlike in FIG. 2A, where the person is initially much smaller, and the smaller initial size expands to be a larger final size).

FIG. 2C illustrates a second example in which the center portion of the same video (from FIGS. 2A-2B) is initially zoomed in to the point where the center portion completely fills the screen. Filling the screen in this manner displays the portion shown (e.g., the person, in FIG. 2C) to be larger in the horizontal orientation than they would be in the full-screen vertically-oriented version. Hence, as the user rotates the device, the displayed portion zooms out to include more of the sides of the video until the orientations finally match; the entire screen is occupied with portions of the video throughout the rotation.

Note that while the examples of FIG. 2A-2C illustrate a transition of a device from a vertical to a horizontal orientation in the context of a horizontally-oriented video, the same techniques can be applied for a transition from a horizontal to vertical device orientation in the context of a vertically-oriented video.

In some embodiments, such techniques may further involve indicating whether a video that is playing is full screen and/or whether rotating the device would display a larger percentage of the video. Some of the preceding and following techniques involve zooming in on portions of a video to fill the entire screen, which masks a user's awareness of whether some of the portions of the video are being masked/cropped or not. Hence, an icon or some other indicator facilitates indicating one or more of (1) the native orientation of the video; and/or (2) that a larger percentage of the video can be displayed if the video and/or the device are rotated. Such indicators make users aware that rotating their device will display a larger and/or otherwise more beneficial aspect of the video, and can also serve as mechanisms by which users can change rotation and display parameters and/or characteristics.

Figure 9:
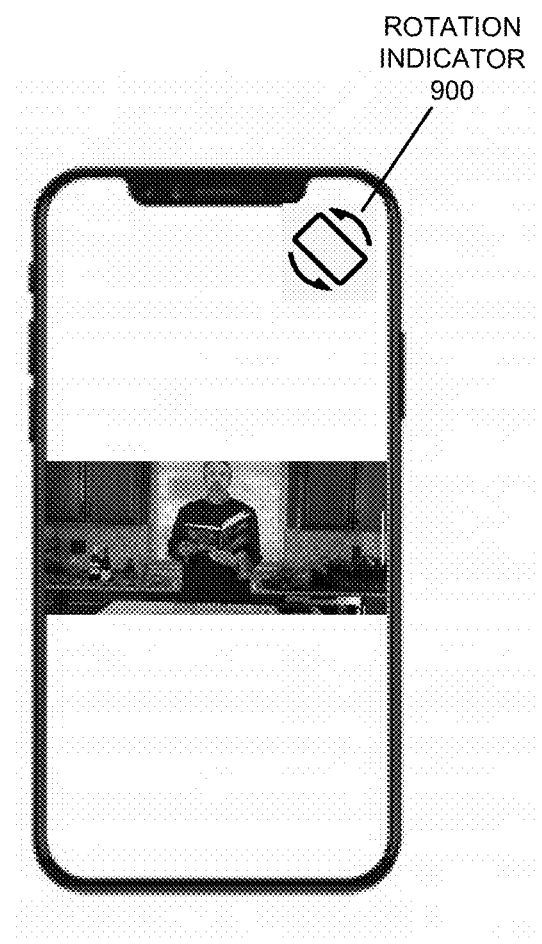
FIG. 9 illustrates displaying a rotation indicator in accordance with an embodiment.

FIG. 9 illustrates an exemplary rotation indicator 900 that indicates to a user that a presently-being-viewed video could be displayed in larger manner if the orientation of the viewing device were changed. Such a rotation indicator could appear in a well-known, user-specified, and/or video-content-dependent location on the display. In some scenarios, such an indicator could be displayed at the end of a preceding video to indicate to a user that the device should be rotated for the next video. In some embodiments, a smaller indicator could be displayed in advance of a subsequent video, and then be enlarged and/or displayed more prominently in the next (misaligned) video.

In some embodiments, screen rotation techniques may include screen lock capabilities that prevent inadvertent rotation due to normal, unintentional shifts and/or movements of a displaying device. For instance, as a device rotates towards some final orientation (e.g., either a final orientation that matches a video's orientation with the screen orientation or makes the two orientations directly perpendicular) the system may be configured to lock the display of the currently-playing video to that orientation, and only unlock the video orientation again if the device deviates from that orientation by a minimum specified amount. For example, this minimum specified amount may be 10-15 degrees; during this initial amount of rotation the video does not rotate, but then after that threshold has been passed the video is rotated as described above.

While the above-disclosed techniques improve the intuitiveness and ease of rotating videos during video playback, some users may still perceive frequently needing to rotate their device as being frustrating. In some embodiments, the system reduces such potential frustration by attempting to reduce the number of transitions between horizontal and vertical orientations. For instance, the system can take into account the orientation of the device and the set of videos that are queued (and/or knowledge of general and/or tracked video trends) to optimize the order in which videos are shown. For example, the system may use machine learning techniques with the goal of maximizing engagement (or some other stated goal) while also reducing the number of transitions between different orientations. The number of transitions can be reduced by grouping multiple videos of the same orientation in sequence using a set of learned rules that factor in a cost of rotation/transition and have been determined to increase engagement (or maximize some other goal). Such rules may be determined over a large number of trials and automated observations of user behavior; these observations facilitate learning techniques that can be leveraged on devices (and/or servers that serve videos to devices) to minimize disruptive user rotations and optimize user engagement.

In some embodiments, a computing device may be configured to track and detect whether device rotation is correlated to or independent of user movement. For instance, a computing device may be configured to distinguish between a user who rotates the device (but otherwise does not move) and a user who rotates the device because they are moving from a first position (e.g., a standing or a sitting position) to a new position (e.g., lying down) that causes a change to the orientation of the screen but in which changing the orientation of what is being displayed on the screen is not particularly beneficial. For example, a user sitting on a couch upright and then lying down (thereby rotating the device in space but not in relation to the user's perspective) may desire a video to continue displaying in a current optimal orientation that matches the characteristics of the display instead of changing orientations because of the user's orientation change. Hence, the disclosed techniques can be enhanced to track the device's orientation in respect to the user's orientation. For instance, the device could track the position of the user's head using the front camera, and in combination with information received from the device's gyroscope determine whether the user's orientation relative to the device is changing or remaining constant during such a position change. More specifically, if the gyroscope indicates that the ground is not perpendicular to a user's head, it could then reorient the display to optimally match the orientation indicated by the user's face. Alternatively, the device could more heavily weight orientation decisions based on the orientation of the user's face. In some configurations a user may also be given the capability to lock the computing device in a position that is identified to be a default starting reference position. For instance, a user may establish a default starting reference position when activating the screen of the device (e.g., bringing the device out of idle mode and enabling the display) or otherwise indicating a preferred initial orientation.

Figure 13:
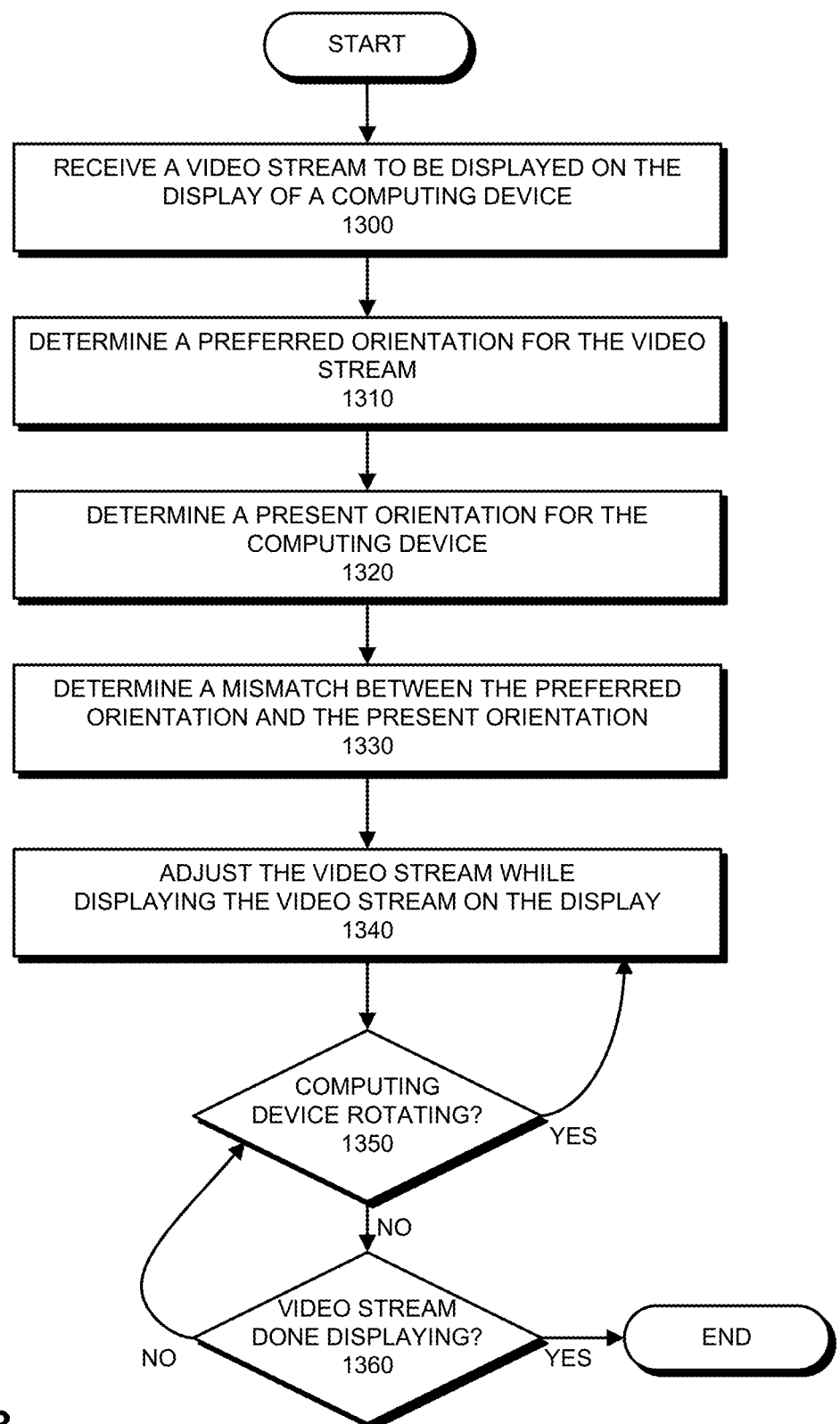
FIG. 13 presents a flow chart that illustrates the process of rotating a playing video stream on the display of a rotating device in accordance with an embodiment.

FIG. 13 presents a flow chart that illustrates the process of optimizing the display of videos. During operation, a computing device receives a video stream to be displayed (operation 1300). The computing device determines a preferred orientation for the video stream (operation 1310), determines a present orientation for the computing device (operation 1320), and determines a mismatch between the preferred orientation and the present orientation (operation 1330). The computing device adjusts the video stream while displaying the video stream on the display (operation 1340). As the video stream plays, the computing device detects any rotation of the computing device (operation 1350), and if so, re-adjusts how the video stream is displayed (operation 1340).

The above-disclosed techniques improve the display of videos when video and device orientation do not match, and facilitate the smooth transition of video orientation when the device is rotated to match orientations. The additional techniques in the following sections can complement the above-disclosed techniques and can also further more generally improve video viewing when video and device orientation match as well as when they do not match.

Leveraging Machine Learning to Adjust Video Focus

In some embodiments, the disclosed techniques leverage machine-learning techniques that analyze a video to determine which areas in the video are the most active and/or likely to draw the attention of the viewer at each given point in time (e.g., detect/determine what a user who is watching the video is most likely to look at in each part of the video). Such techniques can further improve the use of limited device screen space by determining and enlarging (i.e., zooming in to) portions of a video that have been determined to be of higher interest and/or importance, especially when a video cannot otherwise completely fit on a display. For instance, such techniques can be used to determine which parts of a video should be expanded and put in the center of the screen when there is a device/video orientation mismatch, but can also be used to zoom in and emphasize the specified portion of a video even when the device and video orientations match. For example, the disclosed techniques may involve determining a specific portion of a horizontal video to start playing and pan around to, in a vertical orientation, based on where the user is likely to look. In some embodiments, the system may use deep vision and machine learning techniques to perform prominent activity analysis on videos. For instance, such techniques localize the parts of a watched video at any given time that are most active and/or likely to draw the attention of a viewer (e.g., shift the focus to such identified areas when the video cannot otherwise fit on the screen completely). For example, such learning techniques may determine that whenever possible focus should be kept on human faces if possible. These techniques may also involve leveraging a model that learns to detect events in such videos, e.g. by detecting movements and people's gazes for one or more videos. Tracked information and/or information gathered from automated analysis can be used to train a neural network that can then perform analysis and determine appropriate focal points for new videos that are not in the training set.

FIGS. 3A-3D illustrate examples of using prominent activity analysis of video to determine and focus on the portions of a video that should be displayed. In these particular scenarios, a horizontally-oriented video is being displayed in a vertical orientation, but the disclosed techniques can also be applied to vertically-oriented videos displayed in horizontal orientations. The goal of the video processing system is to fill the display screen to improve the user experience, if possible. Note that in these figures the superimposed boxes are used to indicate and illustrate the areas of the video that have been identified to be active; these boxes are not actually included in the source videos.

Figure 3A:
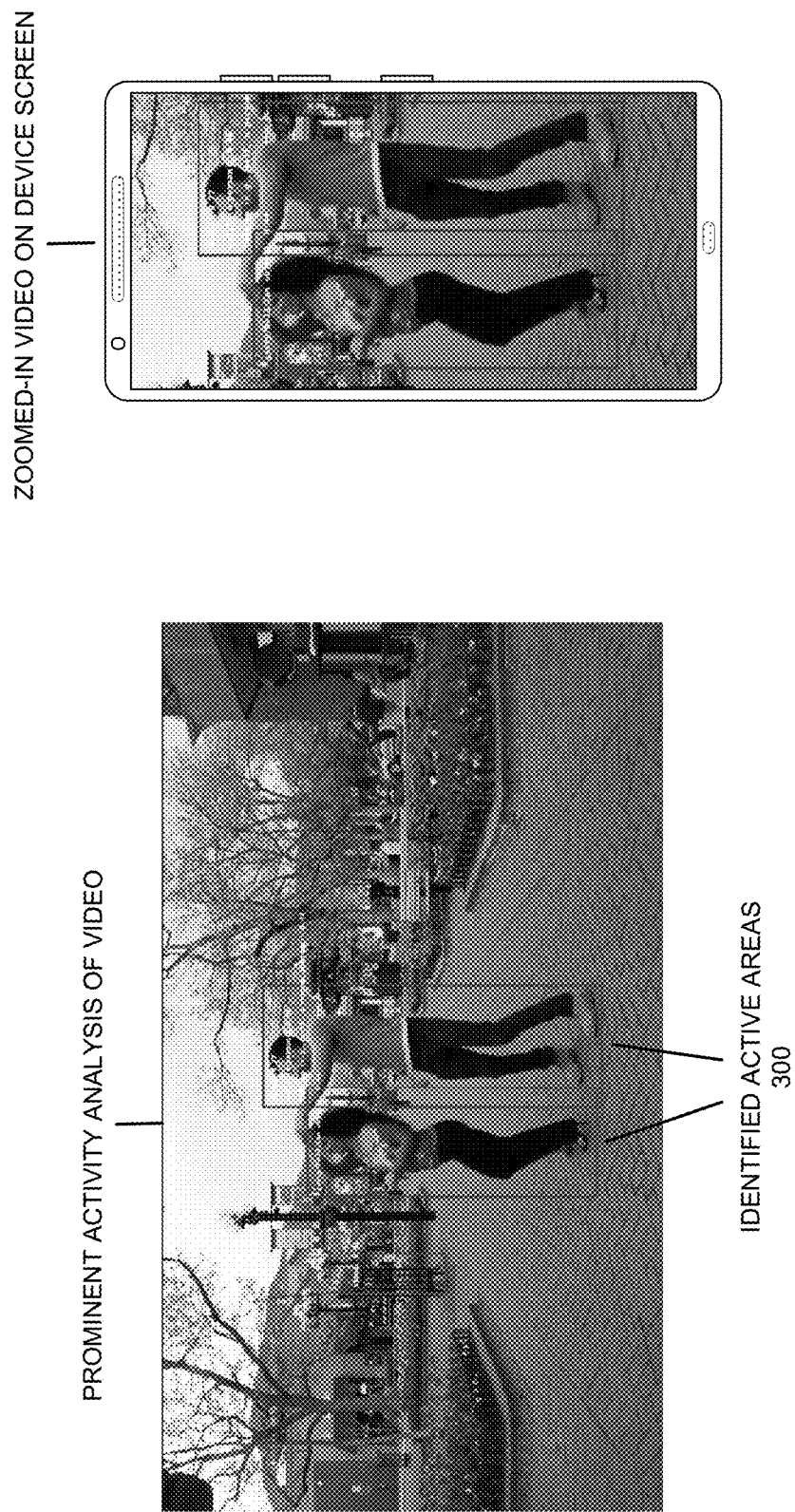
FIG. 3A illustrates an exemplary scenario in which prominent activity analysis is used to determine and focus on the portions of a video that should be displayed in accordance with an embodiment.

In FIG. 3A, prominent activity analysis techniques applied to a video of two dancers indicate identified active areas 300 (specifically, the boxed areas surrounding the two dancers, who are the primary source of motion in the video). Based on this analysis, the video processing system on the device expands a portion of the video that includes identified active areas 300 to fill the device screen. In some videos, the active areas may be sufficiently constrained into a vertical aspect ratio that the video processing system can zoom in to the horizontally-oriented video such that, in the resulting vertically-oriented display: (1) the top and bottom of the video correspond to the top and bottom of the screen (thereby covering the entire display, and cutting off the sides of the video that have less activity because there is not enough room to display them); and (2) the active areas fit completely in the screen.

Figure 3B:
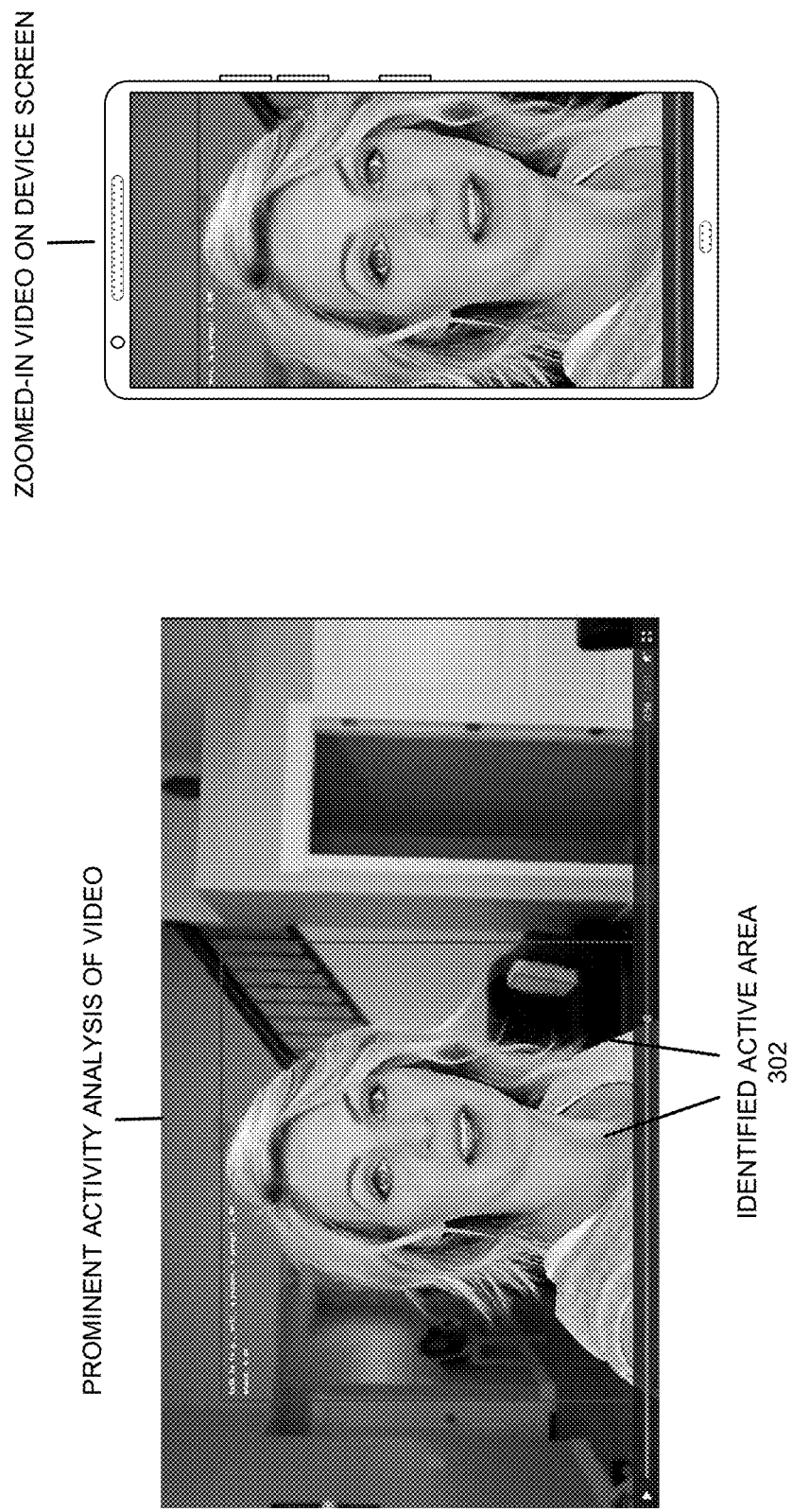
FIG. 3B illustrates a second exemplary scenario in which prominent activity analysis and facial analysis techniques are used to determine and focus on the portions of a video that should be displayed in accordance with an embodiment.
Figure 3C:
FIG. 3C illustrates a third exemplary scenario in which prominent activity analysis determines the portions of a video that should be displayed but cannot completely fill the screen because the size of the identified active areas precludes both fitting the active areas in the screen and filling the screen in accordance with an embodiment.

FIGS. 3B-3C illustrate slightly different scenarios in which the identified active areas 302-304 (e.g., the marked boxes) in the video, because of their aspect ratios, cannot be expanded in their entirety to completely fill the vertically-oriented device screen. Additional analysis, user input, and/or other factors may be considered in determining how to manage such scenarios. For instance, for the scenario of FIG. 3B, additional facial analysis techniques may be used to zoom in on and track the face of the woman, thereby filling the device screen. Alternatively, as illustrated for the scenario of FIG. 3C, the video processing system may instead ensure that the entire identified active areas 304 are displayed in the device screen, even if this results in some portions of the screen being unused (e.g., blank) during playback.

Figure 3D:
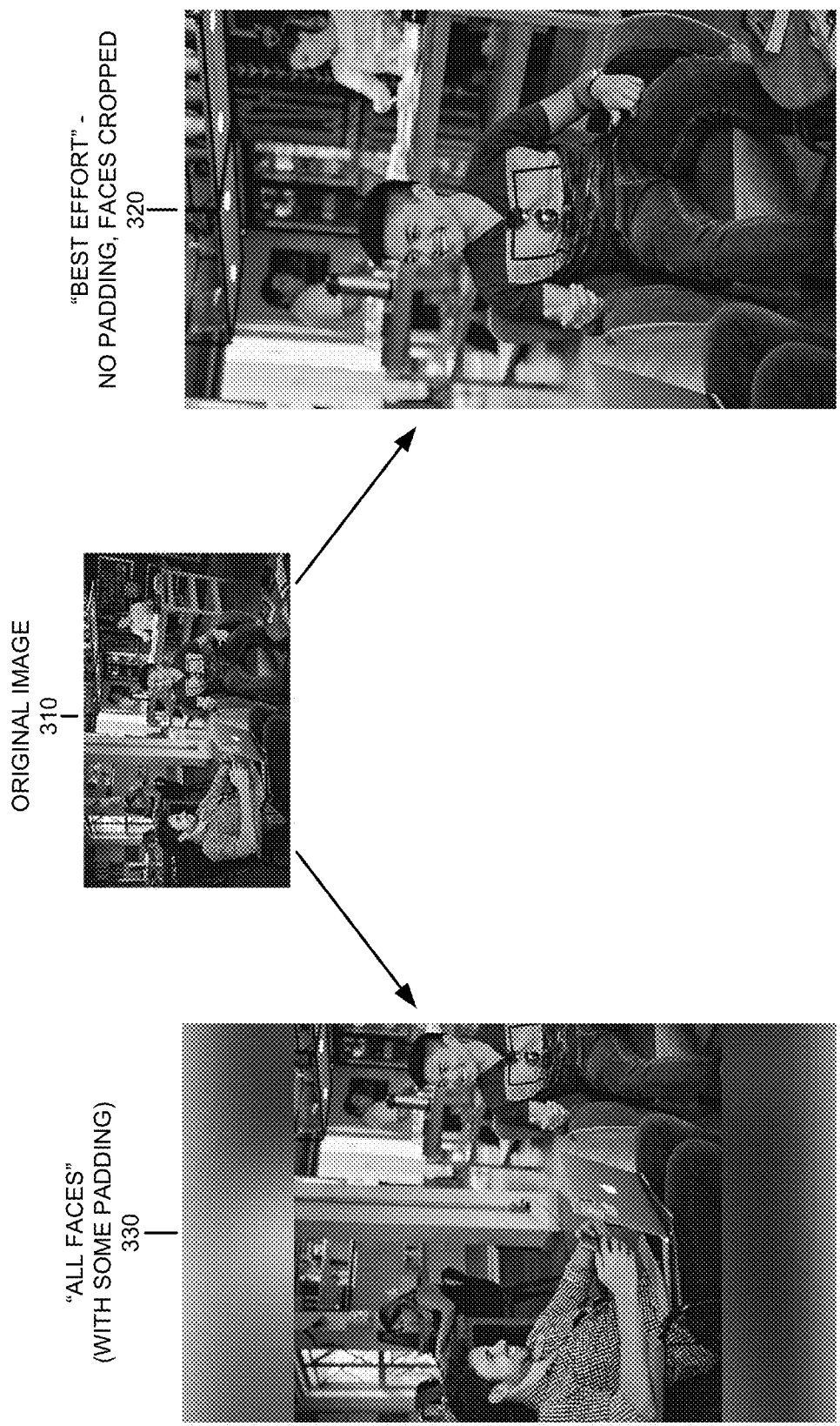
FIG. 3D illustrates a fourth exemplary scenario in which facial-activity analysis determines that a video should be partially zoomed without completely filling the screen in accordance with an embodiment.

Note that prominent activity analysis may in some scenarios identify issues with zooming in too aggressively on a video. For instance, the goal of zooming in to fill (and fully utilize) the available screen space may sometimes conflict with ensuring that all of the portion of the video determined to be of user interest (e.g., all of the action in a video) is displayed. In some embodiments, the video processing system may choose between and/or balance such issues when determining how much to crop and/or zoom in/out for (i.e., scale) a rotated video. Similarly to FIG. 3C, FIG. 3D illustrates an exemplary scenario in which facial-activity analysis of a horizontally-oriented video stream (represented by original image 310) indicates an area of interest that includes multiple primary faces engaged in a conversation. A "best-effort" technique would fill the screen completely with a zoomed-in version of the person currently speaking ("best effort" image 320). However, video facial-analysis techniques may instead determine that users are more likely to be interested in a reduced level of zoom that ensures that the faces of all of the primary participants interacting in the video are displayed, and hence zoom in only to a level that still ensures this constraint is met even though this zoom level leaves unused padding at the top and bottom of the screen (as illustrated by "all faces" image 330). Image edge-extrapolation techniques (e.g., seam carving and image GPT techniques, as described below) can be used in conjunction with such intermediate-zoom decisions to fill in the padded portions of the screen. Note that while this example operates based on facial-analysis techniques that ensure the display of participating human faces, other analysis techniques may determine similar zoom constraints based on other image and/or video aspects that are likely to be of viewer interest. For example, such techniques may include detecting a wide range of events and objects that are likely to be of viewer interest, such as animals, people, and/or objects moving, as well as other things that would draw viewer attention. Note also that while the examples in FIGS. 3A-3D illustrate horizontally-oriented videos that are being displayed on a vertically-oriented screen, the same techniques can be applied to vertically-oriented videos that are displayed on a horizontally-oriented screen.

In some embodiments, the area(s) of a video stream that are identified to be active and/or interesting may change continuously across each given frame of the playing video; e.g., the area of focus may grow, shrink, and/or change location (e.g., spatial set of pixel coordinates) as the video progresses, or the objects of interest in the video may change completely. For instance, the dancers in FIG. 3A may move further away in the distance and get smaller, or move to the right or leftwards directions, and then be superseded by another object that is even more interesting. In some embodiments, the video processing system continuously adjusts the displayed video stream to smoothly transition between predicted areas of interest in a video as the video plays.

Consider a scenario in which a horizontally-oriented video is being displayed on a vertically-oriented display, and the main activity (or otherwise identified area of focus) is not in the center of the (horizontal) video, but is instead located in the left third of the video. The video processing system may initially display a small version of the horizontally-oriented video and large portions of blank space (e.g., as illustrated in FIG. 1A), and then zoom in gradually to the portion of interest, thus eventually using the entire screen to display the area of interest without confusing a user watching the video with overly-fast,—sudden, or—jerky transitions. If the area of interest changes as the video continues to play, the video processing system pans to follow the focal point(s). Alternatively, in some instances it may be beneficial to instantly switch to a new focal point.

In some embodiments, an area of focus that has been determined using the above-described techniques is also factored into video adjustments that occur during device rotation. The system ensures that an identified area of focus is displayed, emphasized, and/or expanded during device rotation. In some embodiments, the video continues playing seamlessly during the rotation process. Alternatively, in some embodiments a video may stop switching between frames briefly during the rotation, so that a user can see the change in orientation (and focus) and determine whether the rotation improves their viewing experience.

FIGS. 4A-4C illustrate examples of rotating a video in which an area of emphasis has been identified. FIG. 4A illustrates a first example in which the identified area of emphasis (the face of the woman on the left in the video) is kept in focus (but not zoomed) as the device that is displaying the video is rotated. As described for FIGS. 2A-2C, the video orientation is kept fixed from the perspective of the user watching the video; the identified area of emphasis is displayed continuously from the initial horizontal device orientation, through the varying diagonal states and then in the final vertical device orientation; in the final state, some of the sides of the video have been cropped, but the identified area of emphasis continues to be displayed. In the example of FIG. 4A, the size/scale of the identified area of emphasis remains constant throughout the device rotation.

FIG. 4B illustrates the same device rotation as FIG. 4A, but illustrates a gradual zoom in on the identified area of emphasis as the device rotates instead of keeping the size of the identified area of emphasis constant (as in FIG. 4A). More specifically, the displayed video fills the screen in the initial horizontal device orientation, but as the user rotates the screen (clockwise), the video processing zooms in on the identified area of emphasis, increasing its size further and further until at the final, vertically-oriented device orientation the video has been zoomed so that the entire screen is filled with the identified area of emphasis.

FIG. 4C illustrates a third scenario that is similar to that of FIG. 4B, except that the system zooms more aggressively in an attempt to ensure that the entire screen is always completely filled across all of the angles of device rotation. Note that the actual level of zoom chosen during rotation may be adjusted based on factors that include user-specified preferences and the set (and locations) of the identified areas of emphasis in a video. For the exemplary video that is pictured, the main activity in the video is not in the center third of the video, but rather in the left third. Hence, as the video is playing on the rotating device, the identified focal area may need to be rotated gradually and offset varying distances away from the center of the (in this example, rectangular) screen during the rotation before coming to a final, zoomed-in, centered state. Such rotation and panning may involve preprocessing and/or analyzing the video stream either in advance or dynamically/on-the-fly to determine which parts of the video have the most changes and how to achieve a smooth transition.

Note that if the identified focal point changes as the video is playing and the device is simultaneously rotating, the system can automatically and simultaneously pan to a new focal point as needed, thereby ensuring that the user does not miss any important actions in the video. Hence, the video processing system may simultaneously be: (1) changing the zoom level of the video; (2) rotating the video (to account for the device rotation); and (3) analyzing the actions in the video and ensuring that the video is panned to follow and display the primary identified area(s). Such techniques may be particularly useful for augmented reality displays, allowing more display resolution to be dedicated to where the user is likely to focus.

In some embodiments, the disclosed video analysis and adjustment techniques can be performed on the device playing a video. Alternatively, a server that is streaming a video to one or more devices may already pre-process a video to detect areas of interest/focus for the entire video, and then include such information to requesting devices along with the video stream. Performing such analysis on the server reduces the power-intensive processing that needs to be done on the (often power-constrained) client devices, and saves computing effort overall (e.g., allows the server to perform such analysis once, and then have all clients benefit from that analysis). In another example, device configuration and orientation information may also be transmitted to the server, thereby enabling the server to regenerate the video (or send a different, cropped version of an alternative orientation that was pre-computed for this purpose) with different elements to fit the screen based on the sub-portions of the currently displaying video that are identified to be active and/or of interest. In some instances, performing such pre-processing on the server also facilitates reducing the amount of data that needs to be sent for the video (e.g., by cropping out portions that will not be displayed in the current orientation and/or level of zoom, and only sending from the server the specific spatial video sections that will be displayed). Note that in some instances a user may want to specifically focus on another portion of a video that is not active (e.g., a portion of the background that is of interest for forensic purposes), and may disable predictive focusing techniques.

Predictive Regeneration of Videos

In some embodiments, a display system can predictively expand and/or regenerate portions of videos to fit a specific screen orientation. For instance, based on prediction data that predicts where a viewer is most likely to look in a video stream, a display system can re-generate the video stream to fit a specific screen orientation by focusing on the specific parts of the video that the user is likely to look at and then using techniques such as context-aware image-resizing. Such techniques can resize an image by filling in or removing portions of the video that include repeating and/or redundant patterns, while ensuring that the most relevant information and/or objects in each given image are maintained.

Figure 5A:
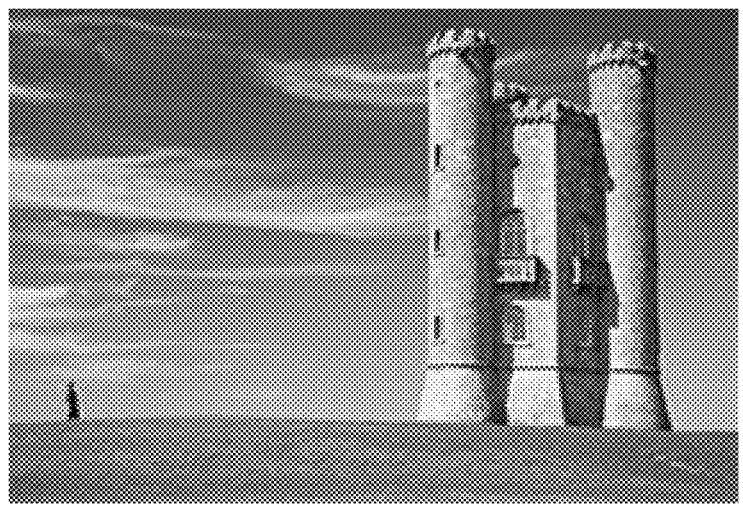
FIG. 5A illustrates an initial exemplary image in accordance with an embodiment.
Figure 5B:
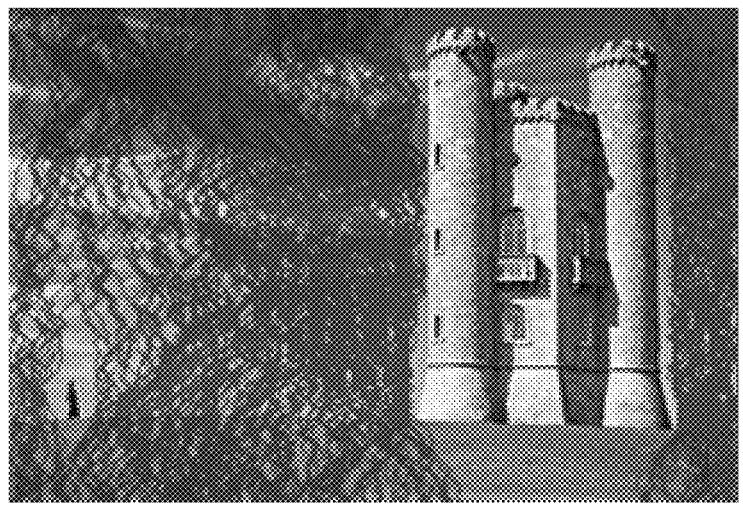
FIG. 5B illustrates a set of seams in the initial exemplary image of FIG. 5B in accordance with an embodiment.
Figure 5C:
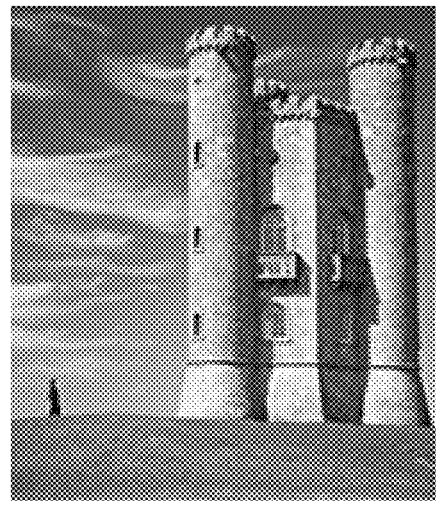
FIG. 5C illustrates a reduced version of the exemplary image of FIG. 5C in which the seams have been removed in accordance with an embodiment.

FIGS. 5A-5C illustrate an example of seam carving, which is a context-aware image-resizing technique that reduces the perceived space for less active and/or less likely to be watched portions of a video that are currently being displayed. FIG. 5A illustrates an initial image in which one portion (the castle structure) is identified to be of primary interest. FIG. 5B illustrates a set of vertical seams that are identified in the picture of FIG. 5A as being candidates for removal. FIG. 5C illustrates a reduced version of the picture from FIG. 5A where the seams indicated in FIG. 5B have been removed, leaving the portion of interest unchanged while substantially changing the horizontal size of the original image. Such techniques can be applied to an entire video stream to regenerate the video stream to fit a desired orientation while maintaining the portions of the video stream that are predicted to be of interest to the viewer. Note that such techniques can be applied both vertically and horizontally (e.g., both to narrow or shorten a video stream), and that similar techniques can also be applied to the reverse effect (e.g., adding additional streams to widen or heighten an image and/or video stream in a manner that fills a display screen of a target orientation with content that more closely matches the content than blank borders).

In some embodiments, applying seam-carving techniques involves pre-analyzing videos on a server and including seam and/or seam-weight information in a streaming video to indicate which pixels should be removed and/or added if the receiving device is rotated while displaying the video stream. In alternative embodiments, computing devices with sufficient processing power could perform pre- or on-the-fly seam analysis of videos in real time while a video is being recorded and/or when it is played back.

Figure 6A:
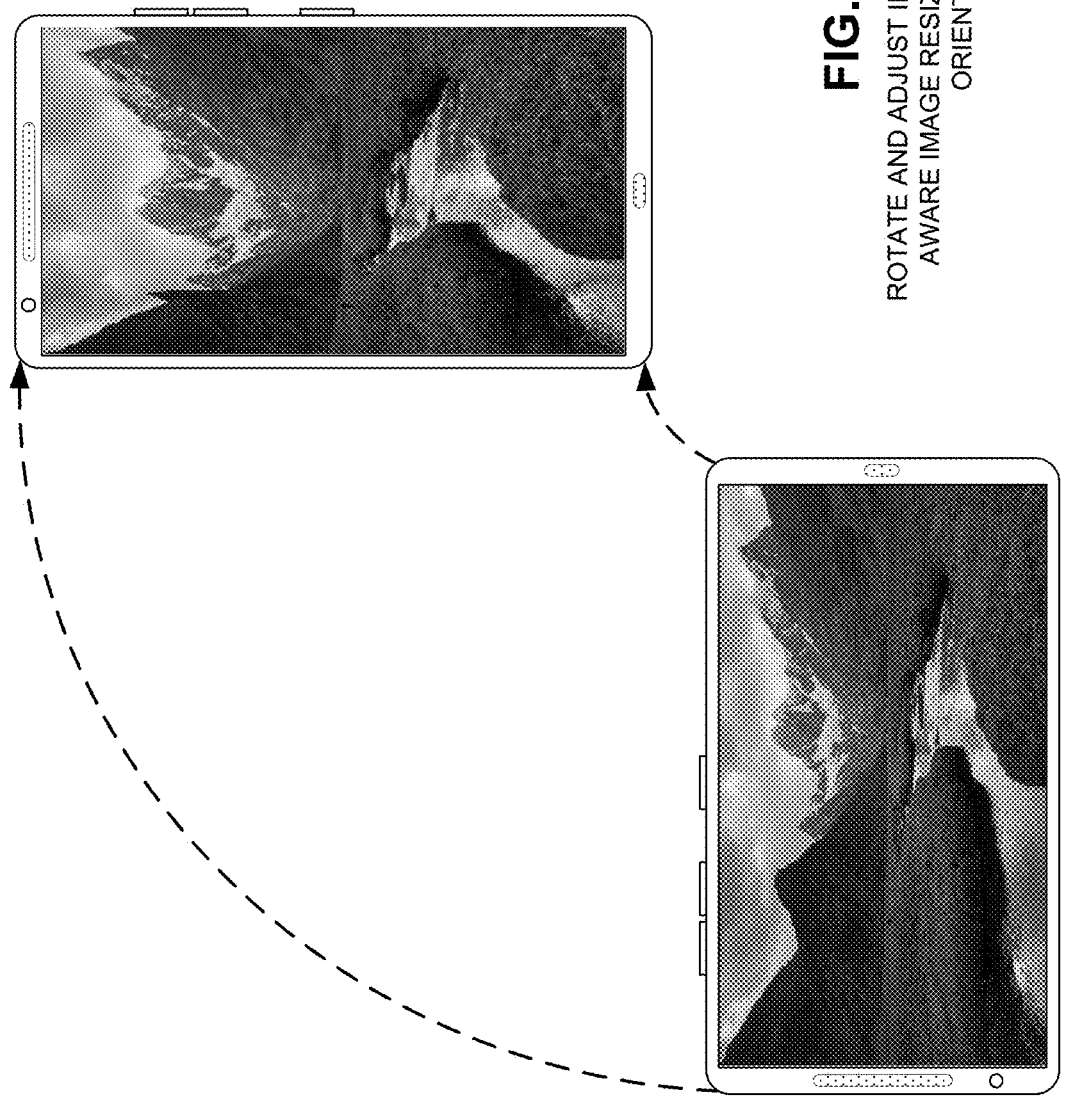
FIG. 6A illustrates a first example in which context-aware image-resizing techniques are applied to a video stream in accordance with an embodiment.
Figure 6B:
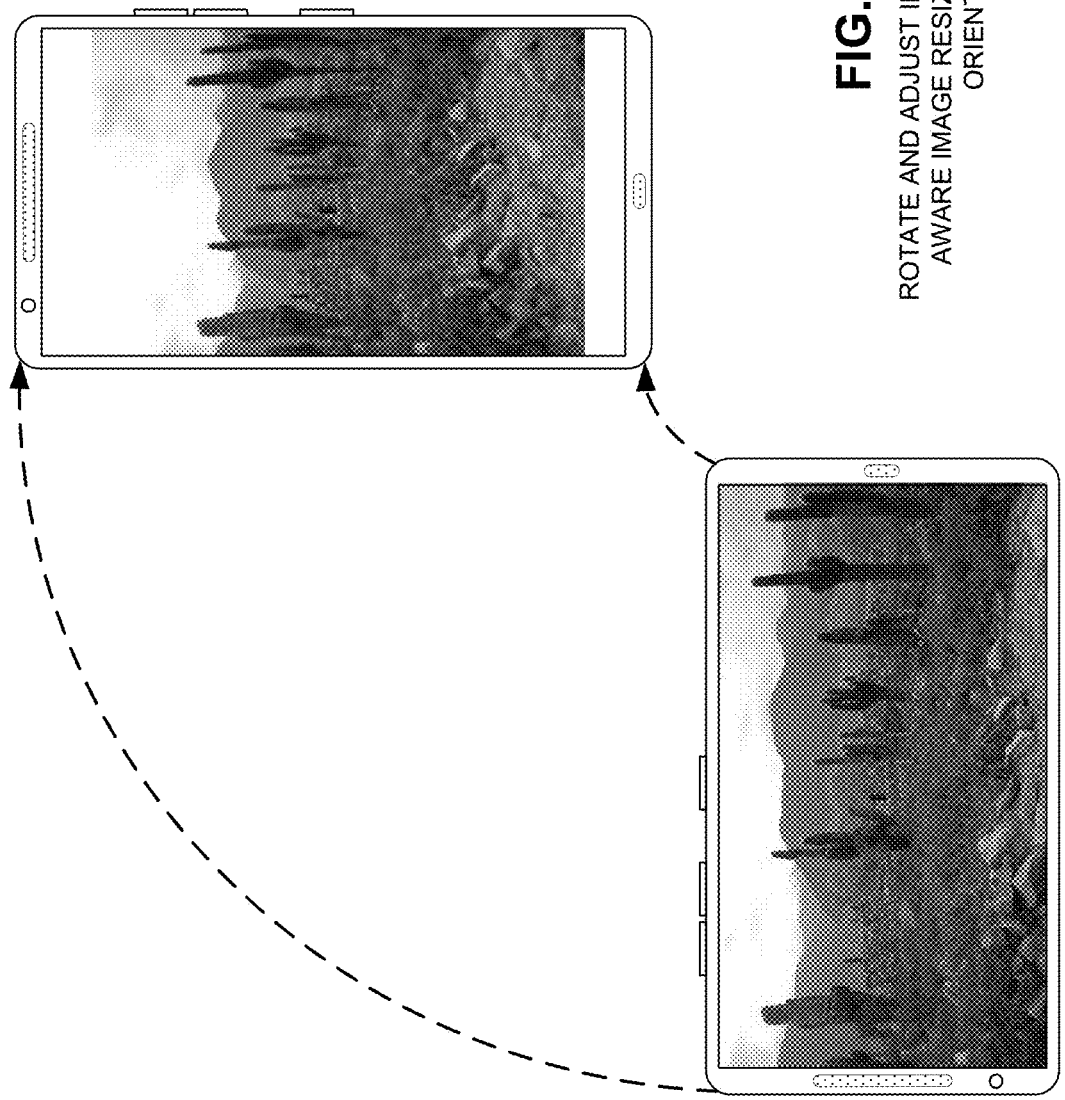
FIG. 6B illustrates a second example in which context-aware image-resizing techniques are applied to a video stream in accordance with an embodiment.

FIGS. 6A-6C illustrate several examples in which context-aware image-resizing techniques are applied to specific static images from video streams in the context of a computing device that is rotated. Note that these examples primarily illustrate the removal of vertical seams (not shown) to fit an initial landscape image to a more vertical orientation (hence substantially reducing or eliminating borders at the top and bottom of the vertically-oriented device in FIGS. 6A-6C). In some embodiments, rotation may involve both the removal of seams in one orientation as well as the additional of seams in the opposite orientation to completely fit the final result to the target device screen. Note that while FIGS. 6A-6C illustrate a rotation from a horizontal orientation to a vertical orientation substantially similar techniques can be used to perform a rotation from a vertical orientation to a horizontal orientation.

Note that such techniques can be used both to fit to the size and orientation of a device screen (as illustrated above)

as well as to match an arbitrary size and orientation of a player and/or video feed presented in a window on a sub-portion of a display screen (e.g., a video player window on a computer screen, embedded in a webpage, etc.).

In some embodiments, context-aware image-resizing techniques are extended to leverage machine-learning techniques in video generation, such as high-fidelity video prediction with large stochastic recurrent neural networks. Generative adversarial networks can train a neural network to regenerate images and video streams by letting the neural network produce subsequent next images in the video stream predictively, and then using a discriminator network to determine whether such images will look realistic. These steps may be repeated until the discriminator networks determines that the resulting video frames look sufficiently realistic. Such techniques can be used to regenerate a video that focuses on the portions of the initial video stream that have been determined as containing activities that are likely to be of interest to viewers and fit a target display orientation.

Edge Extrapolation of Videos

In some embodiments, a display system can extrapolate additional material at one or more edges of a video stream in order to fill blank spaces. For instance, when displaying a vertically-oriented video in a horizontal orientation, instead of displaying two black columns on the sides of the video stream, extrapolation techniques could generate additional material surrounding the scene. For example, the display system could use a generative adversarial network or another machine learning technique to determine material that could seamlessly be added to the existing video stream to fill the entire device screen. While such additions would not change the size of the actual contents of the video stream that were being displayed, they would lessen the visual impact of blank space from a viewer's perspective.

In some embodiments, the display system can rearrange and/or regenerate portions of a horizontally-oriented video to a vertical orientation (and vice versa) by: (1) determining the most relevant elements in a video based using the above-described prominent-activity analysis techniques (e.g., determining the likely attention of a user by training a neural network based on movement in a video or by training on tracked user gazes to determine the most relevant parts of a video at any given time), and then (2) re-generating the video using a generative adversarial network or a context-aware resizing technique to fill in any blank space, or adjusting portions of the video stream to emphasize the relevant elements and reconstitute their surroundings in the most realistic looking way. For instance, transformer model techniques (such as Image GPT) can be used to predict the next pixel on the edge of a padded area based on the previous pixels in an image to generate convincing and realistic image completions for blank padded areas. Such modeling techniques can be used to complete a scene when rotation (or other factors) would otherwise leave a blank padded area.

In some embodiments, the display system can be configured to stream the portions of a video that the user is currently looking at based on the current orientation of the computing device, and then stream in additional video areas when the user reorients the computing device to provide a higher quality viewing experience. To provide a seamless video viewing experience in situations where a user reorients the computing device quickly, the computing device may be configured to pre-fetch areas of the video that the user is likely to orient to based on predicted motion. A relatively small amount of pre-fetched data can greatly benefit such efforts. For instance, a small number of pixels can be leveraged by a "fill-in-the-blanks" display system that leverages a generative adversarial network that can reconstruct a plausible set of peripheral video from a small fraction of pixels. Such reconstruction may be performed by finding closest matching patterns for the sparse input stream of pixels from a learned set of natural videos.

Video Summarization

In some embodiments, artificial intelligence and/or machine-learning techniques are leveraged to summarize videos. For instance, videos can be analyzed to determine the portions that are likely to be of interest to one or more users, and then condensed to provide shorter videos that still include all of the portions of interest but presented more compactly, thereby reducing the amount of viewing time needed. Such techniques can also provide benefits in reducing the amount of network bandwidth needed to transmit a given video, the amount of storage space needed to store the video, and the amount of battery power needed to display the original message of the video (by reducing the amount of active display/play time needed).

Figure 10:
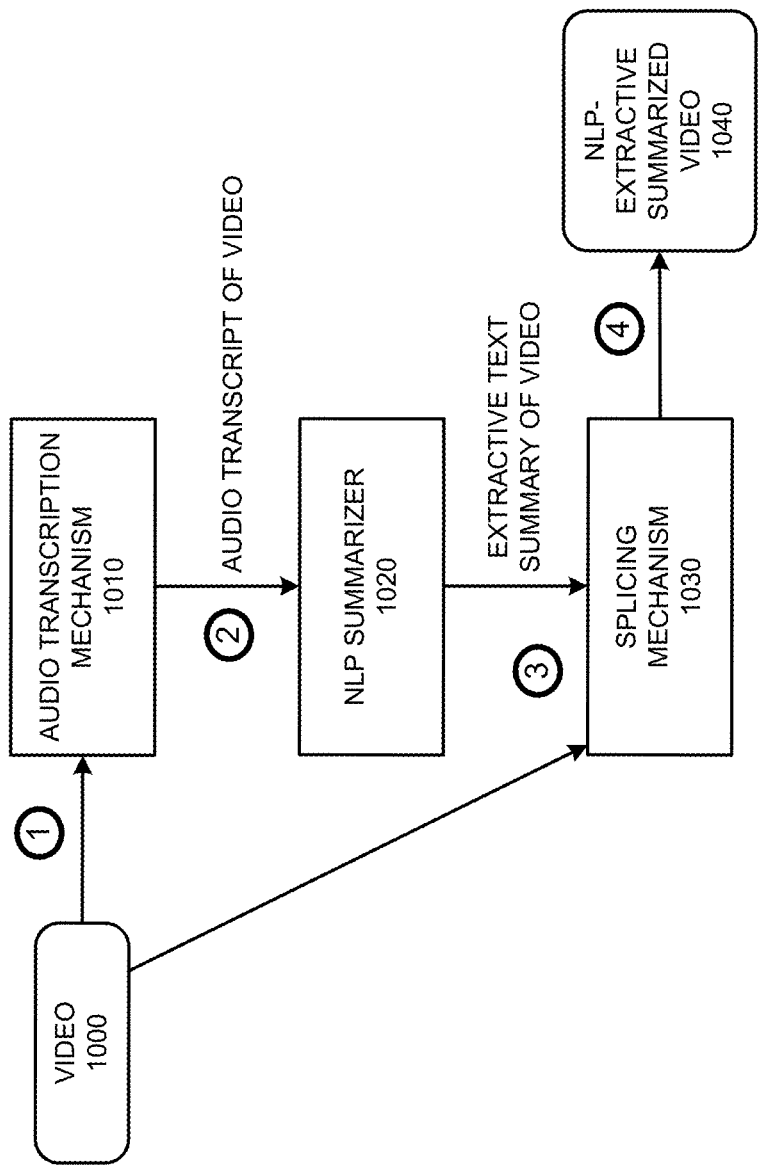
FIG. 10 illustrates an exemplary scenario in which a video is processed using extractive summarization techniques to generate a summarized video in accordance with an embodiment.

In some embodiments, extractive summarization techniques are used to generate a summarized version of a target video. FIG. 10 illustrates an exemplary scenario in which a video 1000 is processed using extractive summarization techniques to generate a summarized video. Video 1000 is first processed by an audio transcription mechanism 1010 (operation 1) that generates a transcript of video 1000's audio stream (e.g., using a transcriber or a speech-to-text technique) that includes exact time stamps of every word (and/or noise) in video 1000. The audio transcript of the video is then submitted to a natural-language-processing (NLP) summarizer 1020 (operation 2), which applies an NLP model to the transcript to perform extractive summarization. More specifically, the NLP summarizer 1020 determines and selects the most important portions of the transcript into a summarized transcript (e.g., an extractive text summary of video 1000). This summarized transcript is then sent to a splicing mechanism 1030 that uses the time stamps included by the audio transcription mechanism 1010 to determine which parts of the video correspond with each respective part of the summarized transcript. Splicing mechanism 1030 stitches together sub-portions of video 1000 that correspond to the identified time stamps of the summarized parts to generate an NLP-Extractive summarized video 1040 (operation 4). Note that while this example bases aspects of the summarization on the audio stream of the target video, additional types of analysis may also be used independently or in conjunction with audio analysis to determine which portions of the target video should be included in the summarized version. For instance, summarization analysis techniques may be trained to detect and consider additional factors such as scene transitions and salient visual activity to determine portions of a target video that should be included in a summarized video.

NLP summarizer 1020 may include parameters that consider user preferences (or other additional criteria) to determine how short or long a summary should be. Based on such input the same target video may be condensed to different lengths and levels of detail. Note that splicing mechanism 1030 may use smoothing techniques to stitch together the desired portions of video 1000 to reduce choppiness in the playback of summarized video 1040. Computer vision models can also be incorporated to detect scenes with rapid visual changes and include them in the clips added to the video summary in their chronological order to ensure that the summarized video retains similar transitions to the original.

Note also that a transformer model could also be trained on videos and video summaries in a multi-modal fashion (e.g., being trained on text and videos at the same time) to output video summaries in an end-to-end single process. This is different from existing machine-learning transformer language models, which are typically trained on either text or on video/images, separately. Instead, embodiments of the present invention take a transformer machine-learning language model that is trained both on text AND on video to understand the video and output a summary. To train such a multi-modal model, for example: (1) users can create video summaries with a manual summarization tool to allow the model to learn what users would like summarized, and then (2) the model can be used to generate multiple versions of video summaries that are then presented to users.

In some embodiments, a machine-learning transformer model may generate multiple different versions of summarizations for a target video and provide an editing tool that allows the users to choose which summarization is more accurate and/or provide direct feedback to the model. Users selecting a favorite summary from several generated versions further helps to train the model (e.g., using approaches that learn to summarize based on human feedback); as the collection of users' summarization selections grows, the model gathers feedback that facilitates creating better summarizations. In some embodiments, users may create and/or select different levels of summarization as well (e.g., based on a specified desired length for a generated summary). For example, by default a model may generate a summarized video that more compactly conveys all of the information provided in the original target video, but users with even stricter time limits may specify an even shorter time interval. In this scenario, the model attempts to determine which information is more relevant and creates an even more compact summarized version that meets the time specifications (and potentially cuts out some material that is determined to be statistically less relevant).

As described above, extractive summarization techniques generate a summarized version of a video by detecting portions of interest and then extracting and combining the corresponding portions of the video into a summarized video. Another alternative set of summarization techniques perform substantially similar operations to determine the portions of interest but then instead of extracting and splicing together pieces of the original video instead generate a new summary video. More specifically, abstractive summarization techniques comprise using a machine-learning language model to derive a new summarization of what was said in the video (i.e., to potentially output totally different sentences than those in the audio transcript to summarize the video contents more concisely and/or clearly). For instance, such abstractive summarization techniques can involve generating a transcript of the target video, extracting information about the faces of people in the target video that were the sources of the audio in that transcript, and then using facial analysis techniques and the extracted information to generate a summarized video with substantially similar faces and corresponding newly-generated audio as if the original faces were speaking the summarized video. Such techniques effectively generate a new video in which synthesized faces and lips (that look like the original faces and lips in the target video) are synchronized with the new summarized audio to appear is if they were speaking the summarized material in a seamless audio-visual flow (i.e., no jump cuts). For example, abstractive summarization techniques can leverage generative language models that have been used to generate abstractive summaries for long documents that exceed several thousand words via neural abstractive summarization. In some scenarios, the generated video and audio can be used to create an abstractedly summarized version of the original video that is entirely synthetic.

One challenge for abstract summarization is determining which person is speaking at a given point in time, so that the summarization in turn is performed in a way that makes it clear that the correct generated person is speaking a given summarized part. For example, for a target video interview between two characters, Ed and Joe, an abstractive generative model needs to determine at which points Ed and Joe respectively are speaking, so that the summarized versions of Ed and Joe speak the summarized portions in a manner that matches the original target video. Feeding the model with the names of the people speaking each given portion may sometimes help the model determine the correct roles in the summary, but this is not certain. Another technique to overcome such issues involves comparing the summarized text with the original text and then executing another model to deduce the probability of each portion of summarized text originating from a given person (e.g., from Ed or Joe in the example scenario). Another technique for addressing such issues is to correlate the summarized text with the original text to determine what original text specifically the model is generating each piece of summarized text from (e.g., which sentences inspire each respective summarized sentence). Alternatively, another way to avoid such issues is to feed the model distinct sections for each participant individually and separately, thereby summarizing pieces piecemeal (e.g., determining every transition between participants, and summarizing each individual participant's section(s) independently). Sections that involve multiple participants talking at the same time might be handled specially (or not summarized at all, and simply included verbatim in the summarized video).

Figure 11:
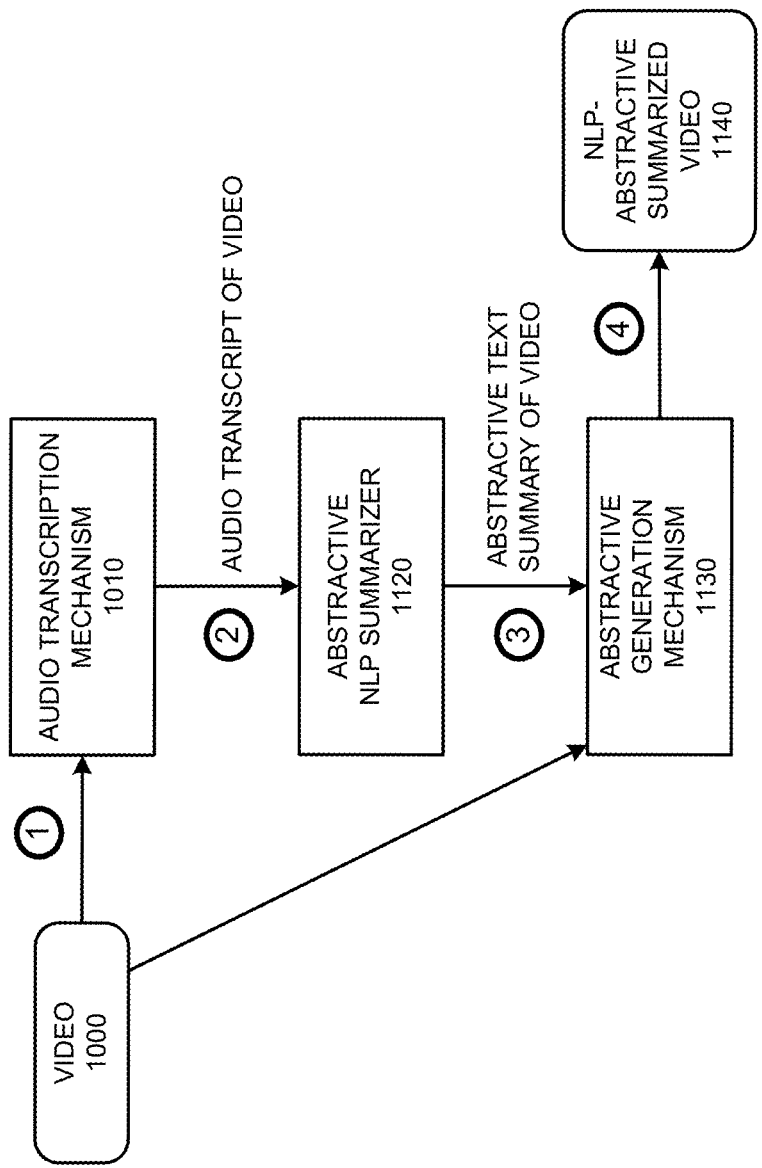
FIG. 11 illustrates an exemplary scenario in which a video is processed using abstractive summarization techniques to generate a summarized video in accordance with an embodiment.

FIG. 11 illustrates an exemplary scenario in which the same video 1000 of the earlier example is now processed using abstractive (instead of extractive) summarization techniques to generate a summarized video. As in FIG. 10, Video 1000 is first processed by an audio transcription mechanism 1010 (operation 1) that generates a transcript of video 1000's audio stream (e.g., using a transcriber or a speech-to-text technique) that includes exact time stamps of every word (and/or noise) in video 1000. Now, however, the audio transcript of the video is now submitted to an abstractive NLP summarizer 1120 (operation 2), such as a transformer-based language model that is trained to perform abstractive summarization of text. Abstractive NLP summarizer 1120 outputs an abstractive text summary of the video (that may include words and sentences that are completely different from and otherwise not present in the earlier audio transcript) that is then fed to an abstractive generation mechanism 1130 (operation 3), which generates and outputs an NLP-abstractive summarized video 1140 (operation 4) that summarizes video 100. Note that the abstractive text summary may include location data that indicates the probable section in the transcript (and source video) from which each abstractive portion was generated.

In some embodiments, generating an abstractive summarized video involves training one or more machine-learning models for the faces and voices of people in the source video. Such learned models enable abstractive summarization techniques to generate the new video and audio outputs that may be needed, since the abstractive summary and summary video may include new words that were not said in the source video. For instance, training a trained machine-learning Deep Fake model base on the faces and voices of people in the source video may involve creating: (1) a first model, Model A, that can generate an output of a face moving to utter any target voice; and (2) a second model, Model B, that can take any text and use text-to-speech with style-transfer techniques to output any desired words for a face in the target voice of the person saying those words. The text from an abstractive summarization can be applied to Model B to output a person's voice saying the lines in the abstractive summary, which is then used with the output of Model A, which generates an output of the face moving in a manner that matches the corresponding voice output generated by Model B. Generating realistic outputs for sections that have no actual match in the original video can involve determining the most probable scenes in the source video that are near the new material to be inserted and then running the models on the abstractive summarizer output to ensure that the inserted portion matches the context of the surrounding portions. Another scenario involves using a transformer attention model derived from Image GPT2 with some modifications. Such a model may take the transcript of an interview that is 2.5 hours and summarize the interview into a shorter time, thereby saving a substantial amount of viewer time while conveying the same information. This summarized material is then fed through additional models to generate video and synchronize lip movements with the audio to produce a summarized interview video.

In some embodiments, a user can also edit a summarized video by performing text-based editing of the abstractive summary, and then letting the trained model generate new video segments that match the edited summary. The optimization strategy can choose segments of the input corpus as base material. Annotated parameters corresponding to the selected segments are seamlessly stitched together and used to produce an intermediate video representation in which the lower half of the face is rendered with a parametric face model. A recurrent video generation network then transforms this representation to a photorealistic video that matches the edited transcript. Such techniques can be used to support a large variety of edits, such as the addition, removal, and alteration of words, as well as convincing language translation and full sentence synthesis.

Note that while the above-described summarization techniques are described in the context of a video stream that includes both video and audio, the disclosed techniques can also be applied to a pure audio stream (without video) as well as a pure video stream (that does not include audio). For instance, both extractive and abstractive summarization techniques could be used to summarize audio streams (e.g., podcasts, etc.), video clips, and movies by stitching together and/or re-generating portions of one or more target audios and/or videos to produce a shorter summarized version. Note also that in some instances a combination of extractive and abstractive summarization techniques may be used to produce a summarized version of the same target video (e.g., in some instances one or the other of the techniques may be more suitable to different portions of the same target video).

Video Extraction and Combination

In some embodiments, machine-learning techniques are used to extract objects from an existing video and then create a new modified video containing the extracted object. Existing photo-editing techniques allow a user to take a photo and then select objects in the photo (e.g., a tree and its components, a person or group of people, a building, etc.). Machine-learning techniques extrapolate on this to extract a highlighted object from a video that includes that object (instead of just extracting a portion of a static image). For instance, a user taking a video using a computing device would indicate the portion of interest (e.g., by hovering the camera over a scene or an item of interest, or by pressing on a touch screen during recording to indicate that the selected portion is of interest). The computing device then tracks the location and presence of the indicated object while taking the video, and uses machine-learning techniques to extract the desired indicated object (and/or scenes) from the video. More specifically, these techniques would cut the selected object out of every image frame and stitch the resulting frames together as a new video containing the object or scene. Note that extracting a scene may involve filling in some additional information, such as background patterns in the collected images.

Once components have been extracted from one or more separate videos, a user can drop and/or combine object and scene components into other videos. For instance, different objects can be dragged into different scenes. This process may involve changing the scale and orientation of inserted components, as well as changing the speed of playback of one or more components. Such techniques can be used to create new video worlds, by dropping in object videos and scenes that were extracted from a number of different video sources.

In some embodiments, additional processing and finishing can be provided using machine-learning techniques. Such processing can smooth and/or enhance a set of mixed component videos that have been combined into the scene. For example, such additional processing may be applied to make all of the components appear to have similar lighting conditions, or even change the angle of orientation for one or more objects (e.g., showing an object from a different and/or rotated viewing angle).

Computing Environment

In summary, embodiments of the present invention optimize the display of videos. The disclosed techniques can be applied to any device that can record and/or display videos. Orientation techniques can be applied to any device that can display videos in windows that may change aspect ratios/sizes and/or be rotated. Furthermore, the disclosed techniques can be incorporated into one or more of video player applications, device operating systems, and device hardware.

In some embodiments of the present invention, techniques for optimizing the display of videos can be incorporated into a wide range of computing devices in a computing environment. For example, FIG. 7 illustrates a computing environment 700 in accordance with an embodiment of the present invention. Computing environment 700 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 7, computing environment 700 includes clients 710-712, users 720 and 721, servers 730-750, network 760, database 770, devices 780, appliance 790, and cloud-based storage system 795.

Clients 710-712 can include any node on a network that includes computational capability and includes a mechanism for communicating across the network. This network may include a local network, a wide-area network (including the Internet), or any other suitable communication network or networks, and may be implemented on any suitable platform including wired and/or wireless networks. Additionally, clients 710-712 may comprise a tier in an n-tier application architecture, wherein clients 710-712 perform as servers (servicing requests from lower tiers or users), and wherein clients 710-712 perform as clients (forwarding the requests to a higher tier).

Similarly, servers 730-750 can generally include any node on a network including a mechanism for servicing requests from a client for computational and/or data storage resources. Servers 730-750 can participate in an advanced computing cluster, or can act as stand-alone servers. For instance, computing environment 700 can include a large number of compute nodes that are organized into a computing cluster and/or server farm. In one embodiment of the present invention, server 740 is an online "hot spare" of server 750. Note that servers may be directly accessible by computing devices, or that one or more computing devices may provide intermediary access to a server. Computing devices and/or servers may access remote platforms and/or services that are provided by remote platforms, such as cloud computing arrangements and services that include one or more servers and/or databases. The term server may comprise a single server or one or more servers that act together to provide authentication, licensing, delivery and/or storage of content (e.g., as part of a content delivery network).

Users 720 and 721 can include: an individual; a group of individuals; an organization; a group of organizations; a computing system; a group of computing systems; or any other entity that can interact with computing environment 700. Users and computing devices may communicate using any suitable communication platform implementing one or more user-device, client-device, and server-device communication applications, including social-networking/messaging applications, websites, and the like, in which users can send and receive video messages to and from particular individuals (e.g., contacts) and/or user groups.

Network 760 can include any type of wired or wireless communication channel capable of coupling together computing nodes. This includes, but is not limited to, a local area network, a wide area network, or a combination of networks. In one embodiment of the present invention, network 760 includes the Internet. In some embodiments of the present invention, network 760 includes phone and cellular phone networks.

Database 770 can include any type of system for storing data in non-volatile storage. This includes, but is not limited to, systems based upon magnetic, optical, or magneto-optical storage devices, as well as storage devices based on flash memory and/or battery-backed up memory. Note that database 770 can be coupled: to a server (such as server 750), to a client, or directly to a network. Alternatively, other entities in computing environment 700 (e.g., servers 730-450) may also store such data.

Devices 780 can include any type of electronic device that can be coupled to a client, such as client 712. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 780 can be coupled directly to network 760 and can function in the same manner as clients 710-712.

Appliance 790 can include any type of appliance that can be coupled to network 760. This includes, but is not limited to, routers, switches, load balancers, network accelerators, and specialty processors. Appliance 790 may act as a gateway, a proxy, or a translator between server 740 and network 760.

Cloud-based compute system 795 can include any type of networked computing devices (e.g., a federation of homogeneous or heterogeneous storage devices) that together provide computing and data storage capabilities to one or more servers and/or clients.

Note that different embodiments of the present invention may use different system configurations, and are not limited to the system configuration illustrated in computing environment 700. In general, any device that includes computational and storage capabilities may incorporate elements of the present invention.

FIG. 8 illustrates an example block diagram of a computing device 800 that optimizes the display of videos. Computing device 800 may include a bus 801, a processor 802, communications circuitry 803, memory 804, code/decoder (CODEC) 805, input components 806, a storage mechanism 807, output components 808, and a camera 809.

In some embodiments, computing device 800 may include or be part of a variety of types of devices, such as a mobile phone (including a "smartphone"), tablet computer, netbook, laptop, desktop, personal digital assistant ("PDA"), set-top box, television, and/or wearable computing devices (e.g., an optical head-mounted display, a watch, etc.), among others. Processor 802 may be any suitable programmable control device and may control the operation of one or more processes, such as video control and display as discussed herein, as well as other processes performed by the computing device 800.

Memory 804 may include one or more different types of memory which may be used for performing device functions. For example, memory 804 may include cache, ROM, and/or RAM. Bus 801 may provide a data transfer path for transferring between components of the computing device 800. CODEC 805 may be included to process digital and analog audio and/or video signals to produce sound, voice, and multimedia. Output components 808 may include components and/or interfaces for providing output such as a display for visual output and one or more speakers for providing audio output. Output components 808 may also include interfaces for providing output to a secondary device. For example, computing device 800, which may include a handheld device, may include an interface for displaying videos on a Television or another device.

Storage mechanism 807 may store multimedia (e.g., video, audio, and photos, etc.), software instructions (e.g., for implementing various functions on computing device 800), and any other suitable data. Storage mechanism 807 may include a storage medium, such as a hard-drive, solid state drive, flash drive, and the like. Storage mechanism 807 may be integral with the computing device 800 or may be separate and accessed through an interface that receives a removable storage medium including, but not limited to, a memory card, USB drive, and optical disk.

Input components 806 may include components and/or interfaces for allowing a user to interact with the computing device 800. For example, the input components 806 may include touch inputs such as buttons, a keypad, a touch screen, and the like, as well as other forms of user input such as positional and proximity information, as well as audio input through one or more microphones. Furthermore, the input components 806 may include components supporting visual user input. For example, camera 809 may capture images for processing as inputs. One embodiment, image processing can be used to identify gestures, such as hand movements and/or eye movements, as user inputs to control the operation of the computing device 800.

Communications circuitry 803 may provide the computing device 800 the ability to communicate with other devices via one or more local, wide-area, or other networks using wired or wireless techniques. For example, communications circuitry 803 may provide connectivity using wireless techniques such as Wi-Fi, Bluetooth™, digital cellular telephone connection, Cellular Digital Packet Data (CDPD) connection, digital satellite data connection or the like.

Camera 809 may enable the computing device 800 to capture video, still images, and/or both. Camera 809 may capture an image or series of images continuously, periodically, at select times, and/or under select conditions. Camera 809 may comprise one or both of a front-facing camera or rear-facing camera on computing device 800.

Computing device 800 may be battery-operated and portable so as to allow a user to conveniently communicate with others via video or audio communication, listen to music, play games, or control other devices. Computing device 800 may be relatively compact, which enables a user to easily manipulate the device's position, orientation, and movement. Accordingly, the computing device 800 may provide techniques of sensing such changes in position, orientation, and movement to enable a user to interface with or control the computing device 800 by affecting such changes. For example, the computing device 800 may include one or more gyroscopes, proximity detectors, accelerometers, and the like. Further, the computing device 800 may include a vibration source, under the control of processor 802, for example, to facilitate sending motion, vibration, and/or movement information to a user related to an operation of the computing device 800. It should be noted that other components may be part of or operatively coupled to the computing device 800, and conversely, all of the components shown in FIG. 8 need not be present to practice the present disclosure.

In some embodiments, computing device 800 uses processor 802 and components 803-809 to perform functions that detect device orientation changes and optimize the display of videos. For instance, computing device 800 can execute instrumented programs or memory scans on processor 802 that inspect, analyze, and traverse the contents of memory 806 or storage mechanism 807 or inputs received via camera 809, input components 806, or communications circuitry 803 to modify a video stream. Note that in many embodiments, processor 802 supports executing multiple different lightweight services in a single VM using docker containers.

In some embodiments of the present invention, some or all aspects of components 803-809 can be implemented as dedicated hardware modules in computing device 800. These hardware modules can include, but are not limited to, processor chips, application-specific integrated circuit (ASIC) chips, field-programmable gate arrays (FPGAs), memory chips, and other programmable-logic devices now known or later developed.

Processor 802 and components 803-809 can include one or more specialized circuits for performing the operations of the mechanisms. Alternatively, some or all of the operations of components 803-809 may be performed using general-purpose circuits in processor 802 that are configured using processor instructions. Thus, while FIG. 8 illustrates components 803-809 (and bus 801) as being external to processor 802, in alternative embodiments some or all of these mechanisms can be internal to processor 802.

In these embodiments, when the external hardware modules are activated, the hardware modules perform the methods and processes included within the hardware modules. For example, in some embodiments of the present invention, the hardware module includes one or more dedicated circuits for performing the operations described above. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

References to "one embodiment," "an embodiment," "an example embodiment," "some embodiments" and the like indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, such feature, structure, or characteristic may be included in other embodiments whether or not explicitly described. The term "substantially" may be used herein in association with a claim recitation and may be interpreted as "as nearly as practicable," "within technical limitations," and the like.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for optimizing the display of videos, the method comprising:

receiving and displaying a video stream on the display of a computing device;

determining multiple areas of emphasis in the video stream;

detecting that the computing device is being rotated from a present orientation to a new orientation and that there will be insufficient space in the new orientation to display the multiple areas of emphasis;

incrementally counter-rotating the displaying video stream, as it continues to play, the number of degrees in the opposite direction from which the computing device has rotated to ensure that the video stream remains at a constant viewing orientation from the perspective of a user of the computing device who is viewing the computing device while the computing device rotates; and as the computing device rotates, modifying the video stream being displayed in real-time to seamlessly remove one or more visual portions of the video stream to ensure that the multiple areas of emphasis can be displayed in the new orientation;

wherein determining the area of emphasis further comprises using prominent activity analysis to continuously determine and analyze one or more areas of emphasis in the video stream; and wherein adjusting the video stream being displayed to emphasize the areas of emphasis further comprises adjusting the scale of the video stream to at least one of zoom in or zoom out the video stream to ensure that the areas of emphasis are prominently displayed in the display.

2. The computer-implemented method of claim 1, wherein modifying the video stream to ensure that the areas of emphasis are prominently displayed further comprises:
determining that removing visual portions of the video stream alone is insufficient to fit the multiple areas of emphasis in a first dimension of the new orientation and also zooming out the video stream;
determining that zooming out the video stream would create in a second dimension of the new orientation a blank area of the display in which no portions of the video stream display; and further modifying the video stream in real-time using a context-aware image-resizing technique that seamlessly expands portions of the video stream in the second dimension to ensure that no blank areas are displayed for the zoomed-out video stream.

3. The computer-implemented method of claim 2, wherein the context-aware image-resizing techniques comprise a seam-carving technique that identifies seams that can be seamlessly duplicated in the second dimension of the video stream to seamlessly expand that dimension of the video stream to minimize blank space on the display.

4. The computer-implemented method of claim 3, wherein modifying the video stream further comprises:
leveraging a context-aware image-resizing technique to seamlessly compress visual portions of the video stream in the first dimension that identifies and removes duplicate visual seams to ensure that the visual details from one or more edges remain displayed in the zoomed-in video stream; and
maximizing the removal of extraneous visual seams of the video stream in the first dimension to reduce the proportion in which the video stream is zoomed out, thereby displaying the multiple areas of emphasis as large as possible in the limited dimensions of the new orientation.

5. The computer implemented method of claim 4, wherein the method further comprises modifying the video stream being displayed to focus on the multiple areas of emphasis before, as, and after the computing device rotates.

6. The computer-implemented method of claim 5, wherein using prominent activity analysis further comprises:
detecting one or more active faces in the video stream;
ensuring that the active faces in the video stream are featured in the portion of the video stream that is displaying on the display before, as, and after the computing device rotates.

7. The computer-implemented method of claim 6, wherein modifying the video stream being displayed to emphasize the areas of emphasis comprises zooming in and focusing on the one or more active faces in the video stream as the computing device and the displayed video stream rotate.

8. The computer-implemented method of claim 7, wherein ensuring that the active faces in the video stream are featured in the portion of the video further comprises not fully zooming in the video stream to ensure that all of the active faces in the video stream remain visible in the display as the video stream is rotated and filling in any blank areas that arise in the video stream due to rotation effects using context-aware image-resizing techniques.

9. The computer-implemented method of claim 8, wherein the video stream can be displayed at any arbitrary angle with respect to the display;
wherein incrementally rotating the displaying video stream in a non-binary manner as the user rotates the computing device facilitates keeping the playing video stream in the original user perspective as the device rotates and reduces viewing disruption and confusion as the computing device is rotated.

10. The computer-implemented method of claim 9, wherein rotating the displaying video stream further comprises:
using tracking mechanisms in the computing device to determine whether the user's orientation relative to the computing device is changing; and
upon determining that the computing device is rotating independently of any changes in the user's orientation, rotating the displaying video stream.

11. A non-transitory computer-readable storage medium storing instructions that when executed by a computer cause the computer to perform a method for optimizing the display of videos, the method comprising:
receiving and displaying a video stream on the display of a computing device;
determining multiple areas of emphasis in the video stream;
detecting that the computing device is being rotated from a present orientation to a new orientation and that there will be insufficient space in the new orientation to display the multiple areas of emphasis;
incrementally counter rotating the displaying video stream, as it continues to play, the number of degrees in the opposite direction from which the computing device has rotated to ensure that the video stream remains at a constant viewing orientation from the perspective of a user of the computing device who is viewing the computing device while the computing device rotates; and
as the computing device rotates, modifying the video stream being displayed in real-time to seamlessly remove one or more visual portions of the video stream to ensure that the multiple areas of emphasis can be displayed in the new orientation;
wherein determining the area of emphasis further comprises using prominent activity analysis to continuously determine and analyze one or more areas of emphasis in the video stream; and
wherein adjusting the video stream being displayed to emphasize the areas of emphasis further comprises adjusting the scale of the video stream to at least one of zoom in or zoom out the video stream to ensure that the areas of emphasis are prominently displayed in the display.

12. A computing device that optimizes the display of videos, comprising:
a processor;
a display;
wherein the processor is configured to:
receive a video stream to be displayed on the display;
display the video steam on the display;
determine multiple areas of emphasis in the video stream;
detect that the computing device is being rotated from a present orientation to a new orientation and that there will be insufficient space in the new orientation to display the multiple areas of emphasis;
incrementally counter rotate the displaying video stream, as it continues to play, the number of degrees in the opposite direction from which the computing device has rotated to ensure that the video stream remains at a constant viewing orientation from the perspective of a user of the computing device who is viewing the computing device while the computing device rotates; and as the computing device rotates, modify the video stream being displayed on the display in real-time to seamlessly remove one or more visual portions of the video stream to ensure that the multiple areas of emphasis can be displayed in the new orientation;

wherein determining the area of emphasis further comprises using prominent activity analysis to continuously determine and analyze one or more areas of emphasis in the video stream; and wherein adjusting the video stream being displayed to emphasize the areas of emphasis further comprises adjusting the scale of the video stream to at least one of zoom in or zoom out the video stream to ensure that the areas of emphasis are prominently displayed in the display.

* * * * *